(12) United States Patent
Kasugai et al.

(10) Patent No.: US 11,490,001 B2
(45) Date of Patent: Nov. 1, 2022

(54) IMAGING APPARATUS

(71) Applicant: Panasonic Intellectual Property Management Co., Ltd., Osaka (JP)

(72) Inventors: Hiroki Kasugai, Osaka (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/352,313

(22) Filed: Jun. 20, 2021

(65) Prior Publication Data
US 2021/0400204 A1 Dec. 23, 2021

(30) Foreign Application Priority Data

Jun. 23, 2020 (JP) .............. JP2020-108235

(51) Int. Cl.
*H04N 5/232* (2006.01)
*G06F 3/16* (2006.01)

(52) U.S. Cl.
CPC ....... *H04N 5/232127* (2018.08); *G06F 3/167* (2013.01); *H04N 5/232933* (2018.08)

(58) Field of Classification Search
CPC ....... H04N 5/232127; H04N 5/232933; H04N 5/23245; H04N 5/23219; G06F 3/165; G06F 3/167
See application file for complete search history.

(56) References Cited

U.S. PATENT DOCUMENTS

2013/0076964 A1* 3/2013 Sirpal ................ G06F 3/04842
348/333.12
2013/0342731 A1* 12/2013 Lee ..................... H04N 5/23218
348/231.4

FOREIGN PATENT DOCUMENTS

| JP | 2010-283706 A | 12/2010 |
| JP | 2016-189584 A | 11/2016 |
| JP | 2017-216640 A | 12/2017 |

* cited by examiner

*Primary Examiner* — Nelson D. Hernández Hernández
(74) *Attorney, Agent, or Firm* — Renner, Otto, Boisselle & Sklar, LLP

(57) ABSTRACT

An imaging apparatus includes: an image sensor configured to capture a subject to generate image data; an audio input device configured to input audio to generate an audio signal indicating audio to be collected during image capturing with the image sensor; a setting interface configured to set the imaging apparatus to an auto mode being an operation mode operable to automatically change a directivity of the audio input device in response to an instruction of a user; and a controller configured to control a sound collection area for collecting sound from the subject in the audio signal, wherein with the auto mode being set by the setting interface, the controller is configured to control the sound collection area to cover the subject by changing the directivity of the audio input device in linkage with an image shooting state of the imaging apparatus.

12 Claims, 27 Drawing Sheets

| | | HORIZONTAL SHOT | | VERTICAL SHOT | |
|---|---|---|---|---|---|
| NON-SELFIE | NO-FACE RECOGNITION | SURROUND | | NO-FACE RECOGNITION | SURROUND |
| | FACE RECOGNITION | FOCUS | | FACE RECOGNITION | FRONT |
| SELFIE | NO-FACE RECOGNITION | FRONT | | NO-FACE RECOGNITION | FRONT |
| | FACE RECOGNITION | FOCUS | | FACE RECOGNITION | FRONT |

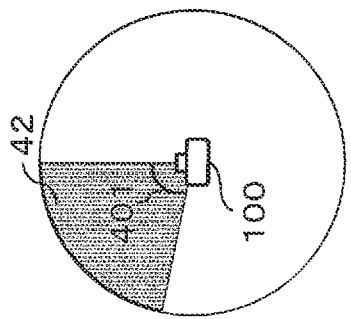
Fig. 6B
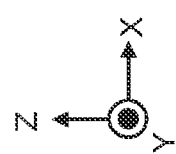
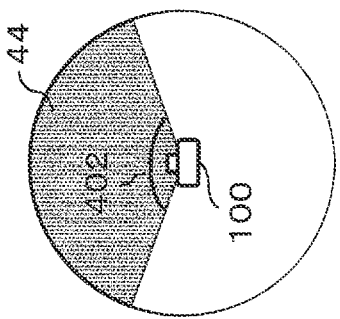
Fig. 6D
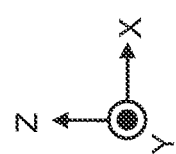
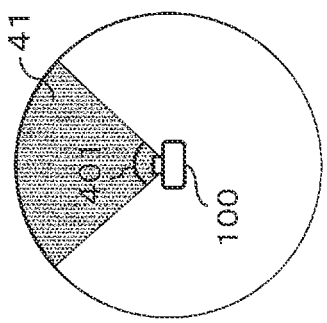
Fig. 6A
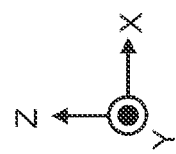
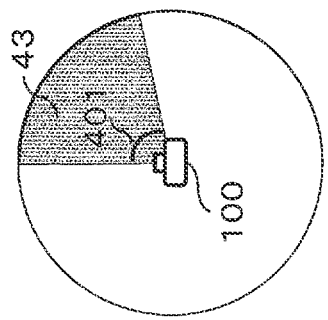
Fig. 6C
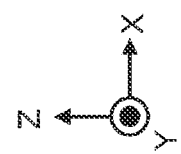

Fig. 9

|  | HORIZONTAL SHOT | | VERTICAL SHOT | |
|---|---|---|---|---|
| NON-SELFIE | NO-FACE RECOGNITION | SURROUND | NO-FACE RECOGNITION | SURROUND |
|  | FACE RECOGNITION | FOCUS | FACE RECOGNITION | FRONT |
| SELFIE | NO-FACE RECOGNITION | FRONT | NO-FACE RECOGNITION | FRONT |
|  | FACE RECOGNITION | FOCUS | FACE RECOGNITION | FRONT |

Fig. 17A

| SOUND COLLECTION TARGET | R1, R3 |
|---|---|
| SOUND COLLECTION AREA | FRONT CENTER SOUND COLLECTION AREA |
| HORIZONTAL ANGLE OF VIEW | 70° |
| FOCUSING DISTANCE | 1m |

Fig. 17B

| SOUND COLLECTION TARGET | R1, R2 |
|---|---|
| SOUND COLLECTION AREA | LEFT HALF SOUND COLLECTION AREA |
| HORIZONTAL ANGLE OF VIEW | 70° |
| FOCUSING DISTANCE | 1.5m |

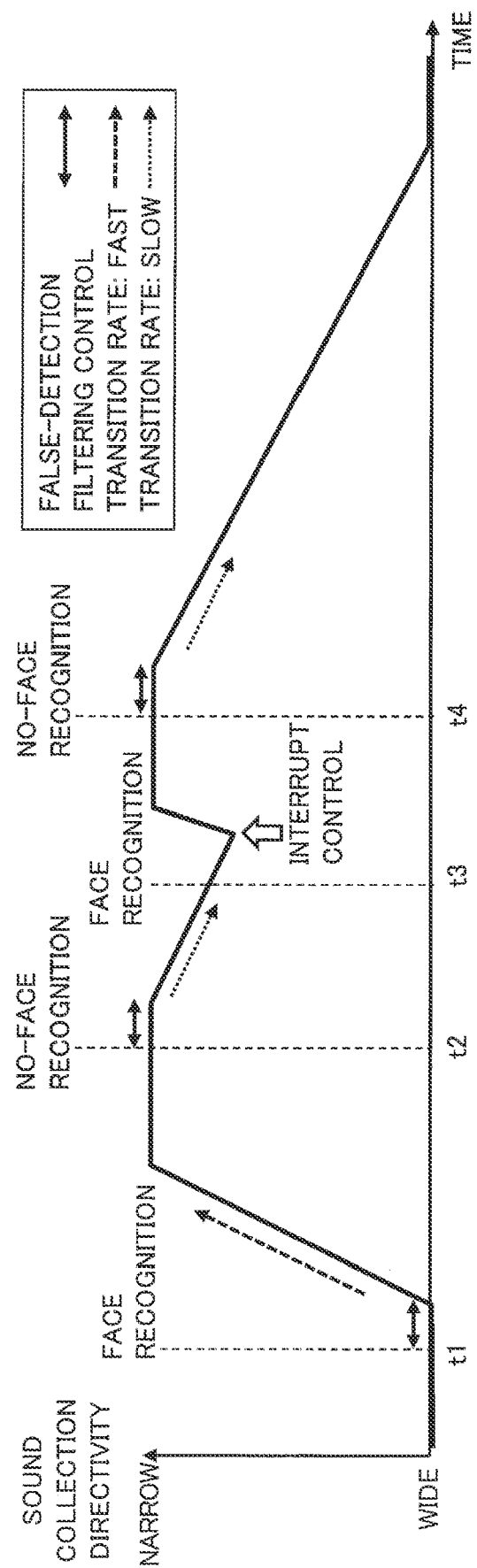

IMAGING APPARATUS

BACKGROUND

1. Technical Field

The present disclosure relates to an imaging apparatus that captures an image while acquiring sound.

2. Related Art

JP 2010-283706 A discloses a video camera having a face detection function. The video camera of JP 2010-283706 A changes a directivity angle of a microphone in accordance with a zoom ratio, and a size of a face of a person in a captured screen. Thus, the video camera controls the directivity angle of the microphone associating with a distance between the video camera and a subject image, and thereby aims to realize control of changing the directivity angle of the microphone so that a voice of a subject can be captured more reliably while matching video and audio. The video camera detects a position and the size of the face of the person (subject), displays a frame (face detection frame) on the detected face area, and uses information on the size of the face detection frame (size of the face).

SUMMARY

The present disclosure provides an imaging apparatus capable of capturing an image with acquiring sound, and facilitating to collect sound of a subject in accordance with intention of a user.

In the present disclosure, an imaging apparatus includes: an image sensor configured to capture a subject to generate image data; an audio input device configured to input audio to generate an audio signal indicating audio to be collected during image capturing with the image sensor; a setting interface configured to set the imaging apparatus to an auto mode being an operation mode operable to automatically change a directivity of the audio input device in response to an instruction of a user; and a controller configured to control a sound collection area for collecting sound from the subject in the audio signal, wherein with the auto mode being set by the setting interface, the controller is configured to control the sound collection area to cover the subject by changing the directivity of the audio input device in linkage with an image shooting state of the imaging apparatus.

According to the imaging apparatus of the present disclosure, it is possible for the imaging apparatus, capable of capturing the image with acquiring sound, to facilitate to collect sound of a subject in accordance with intention of a user.

BRIEF DESCRIPTION OF THE DRAWINGS

FIGS. 6A to 6D are diagrams illustrating sound collection areas in the digital camera 100;

FIG. 9 is a diagram for illustrating an outline of the operation of the auto mode in the digital camera 100;

FIGS. 17A and 17B are diagrams for illustrating management information obtained by the determination processing of a sound collection area;

FIG. 27 is a diagram showing an operation example of the sound collection control in conjunction with the face recognition in the digital camera 100.

DETAILED DESCRIPTION

Hereinafter, embodiments will be described in detail with reference to the drawings as appropriate. However, detailed description may be omitted more than necessary. For example, detailed descriptions of already well-known matters and duplicated descriptions for substantially identical configurations may be omitted. This is to avoid unnecessary redundancy of the following description and to facilitate understanding by those skilled in the art. The inventor(s) provides the accompanying drawings and the following description for those skilled in the art to fully understand the present disclosure, and does not intend them to limit the subject matter described in the scope of claims.

First Embodiment

In a first embodiment, as an example of an imaging apparatus according to the present disclosure, a digital camera will be described that detects a subject based on image recognition technique, controls a sound collection area according to a size of the detected subject, and controls a sound collection gain that emphasizes sound to be collected.

1-1. Configuration

Figure 1:
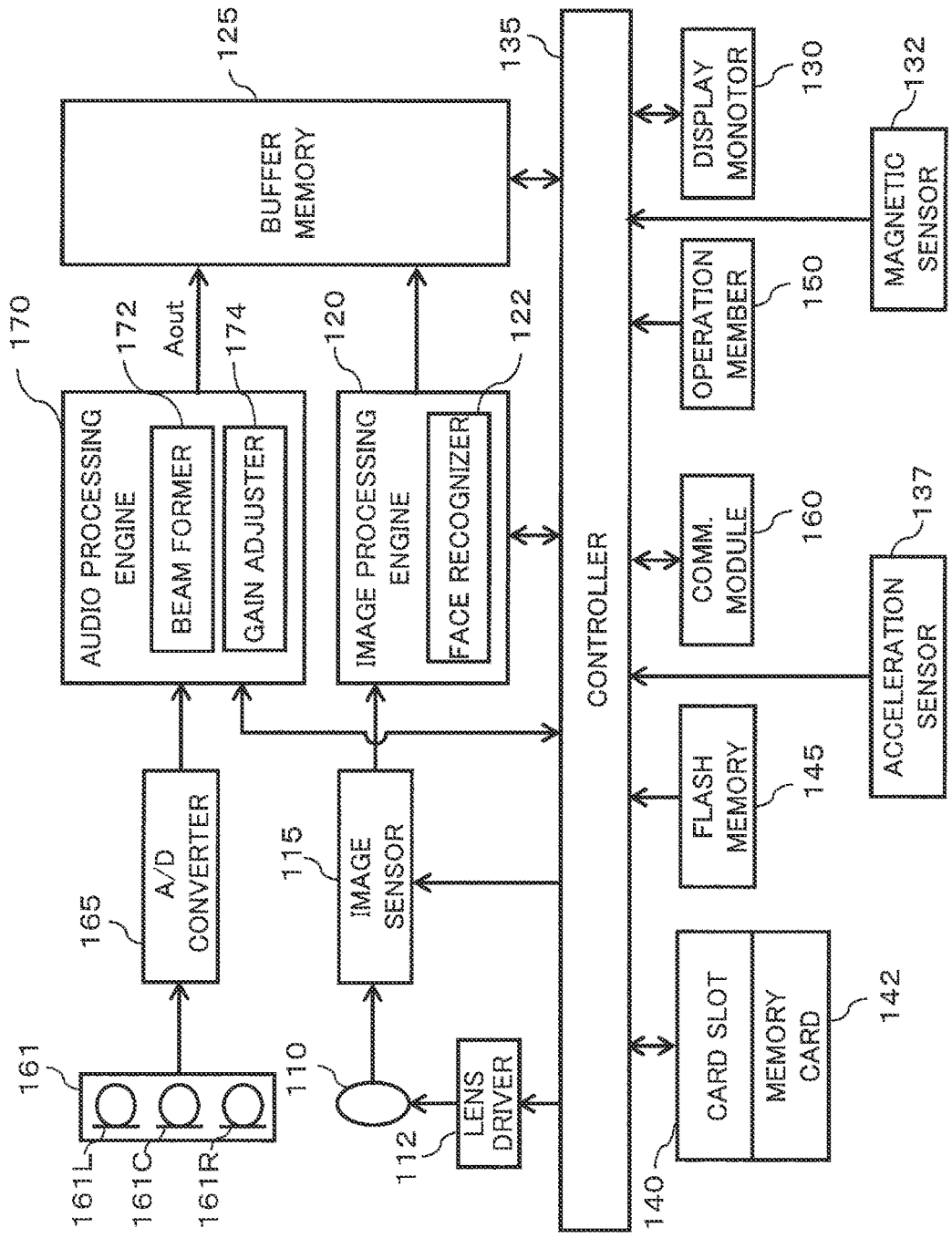
FIG. 1 is a diagram illustrating a configuration of a digital camera 100 according to a first embodiment of the present disclosure.

FIG. 1 is a diagram illustrating a configuration of a digital camera 100 according to the present embodiment. The digital camera 100 of the present embodiment includes an image sensor 115, an image processing engine 120, a display monitor 130, and a controller 135. Furthermore, the digital camera 100 includes a buffer memory 125, a card slot 140, a flash memory 145, an operation member 150, and a communication module 160. In addition, the digital camera 100 includes a microphone 161, an analog/digital (A/D) converter 165 for the microphone, and an audio processing engine 170. In addition, the digital camera 100 includes an optical system 110 and a lens driver 112, for example. Furthermore, the digital camera 100 includes the magnetic sensor 132 and the acceleration sensor 137.

Figure 2:
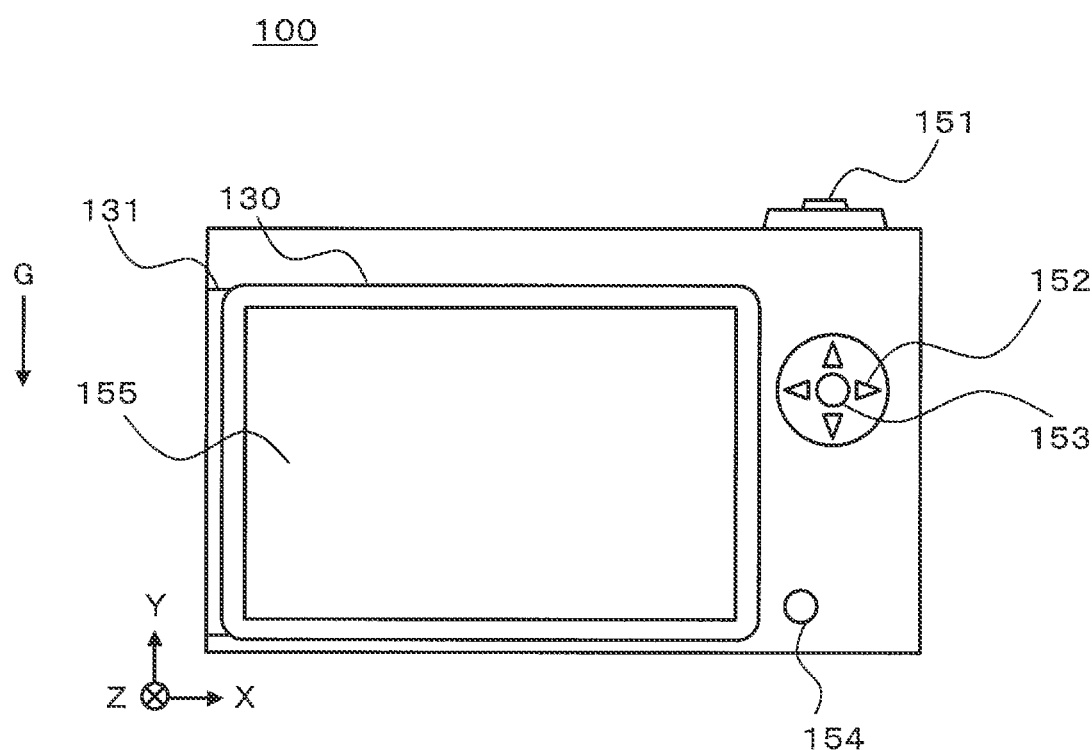
FIG. 2 is a diagram illustrating a back surface of the digital camera 100.

FIG. 2 illustrates a back surface of the digital camera 100. In FIG. 2, the gravity direction G is illustrated together with the three axial directions X, Y, and Z of the digital camera 100. The X, Y, and Z axes respectively correspond to the horizontal angle-of-view direction, the vertical angle-of-view direction of the digital camera 100, and the optical axis direction of the lens in the optical system 110. In the example in FIG. 2, the Y-axis direction of the digital camera 100 is the direction along the gravity direction G, that is, the digital camera 100 is set in horizontal orientation.

Figure 3:
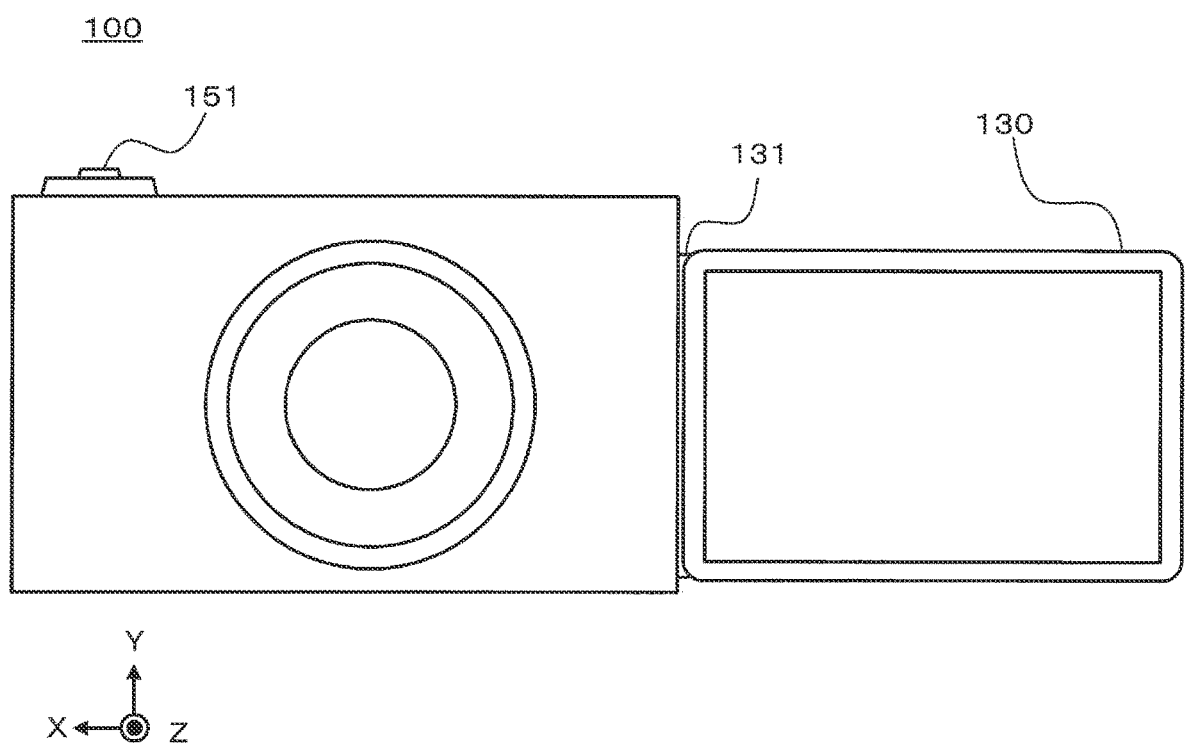
FIG. 3 is a diagram illustrating a state of the digital camera 100 for taking a selfie.
Figure 4:
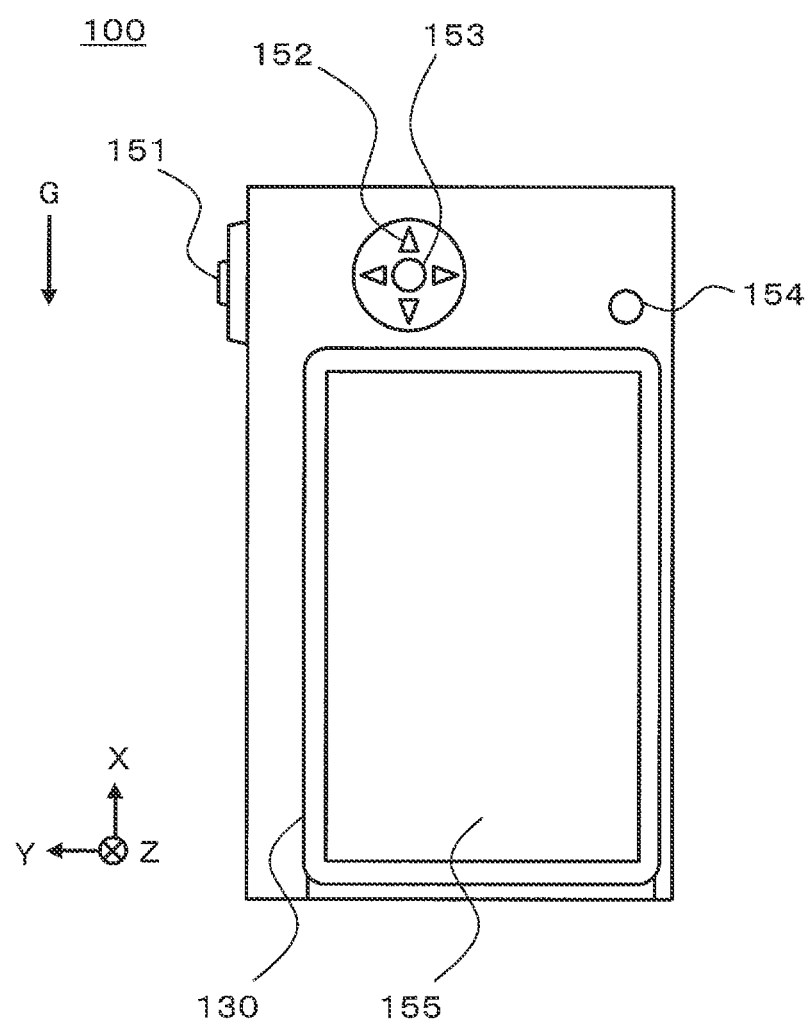
FIG. 4 is a diagram illustrating a state of the digital camera 100 for taking a vertical shot.

The digital camera 100 of the present embodiment is available for a user to take a selfie of taking a picture of himself/herself or to take a vertical shot of using the digital camera 100 in vertical orientation. FIG. 3 illustrates a state of the digital camera 100 for taking a selfie. FIG. 4 illustrates a state of the digital camera 100 for taking a vertical shot.

Returning to FIG. 1, the optical system 110 includes a focus lens, a zoom lens, an optical image stabilization lens (OIS), a diaphragm, a shutter, and the like. The focus lens is a lens for changing the focus state of the subject image formed on the image sensor 115. The zoom lens is a lens for changing the magnification of the subject image formed by the optical system. Each of the focus lenses and the like includes one or a plurality of lenses.

The lens driver 112 drives a focus lens and the like in the optical system 110. The lens driver 112 includes a motor, and moves the focus lens along the optical axis of the optical system 110 based on the control of the controller 135. The configuration for driving the focus lens in the lens driver 112 can be implemented with a DC motor, a stepping motor, a servo motor, an ultrasonic motor, or the like.

The image sensor 115 captures a subject image formed via the optical system 110 to generate imaging data. The imaging data is image data indicating an image captured by the image sensor 115. The image sensor 115 generates image data for a new frame at a predetermined frame rate (e.g., 30 frames/second). Generation timing of the imaging data and electronic shutter operation in the image sensor 115 are controlled by the controller 135. As the image sensor 115, various image sensors such as a CMOS image sensor, a CCD image sensor, or an NMOS image sensor can be used.

The image sensor 115 performs imaging operations of a moving image and a still image, an imaging operation of a through image, and the like. The through image is mainly a moving image, and is displayed on the display monitor 130 in order to allow the user to determine composition for capturing a still image, for example. Each of the through image, the moving image, and the still image is an example of the captured image in the present embodiment. The image sensor 115 is an example of an image sensor in the present embodiment.

The image processing engine 120 performs various kinds of processing on the imaging data output from the image sensor 115 to generate image data, or performs various kinds of processing on the image data to generate images to be displayed on the display monitor 130. Various kinds of processing include white balance correction, gamma correction, YC conversion processing, electronic zoom processing, compression processing, expansion processing, and the like, but are not limited to these. The image processing engine 120 may be configured with a hard-wired electronic circuit, or may be configured with a microcomputer, a processor, or the like using a program.

In the present embodiment, the image processing engine 120 includes a face recognizer 122 that realizes a function of detecting a subject such as a human face by image recognition of a captured image. The face recognizer 122 performs face detection by, for example, rule-based image recognition processing and outputs detection information. The face detection may be performed by various image recognition algorithms. The detection information includes positional information corresponding to the detection result of the subject. The positional information is defined by a horizontal position and a vertical position on an image Im to be processed, for example. The positional information indicates a region surrounding a human face in a rectangular shape as a detected subject, for example (see FIGS. 11A to 11C).

The display monitor 130 is an example of a display that displays various kinds of information. For example, the display monitor 130 displays an image (through image) indicated by image data which is captured by the image sensor 115 and on which image processing by the image processing engine 120 is performed. In addition, the display monitor 130 displays a menu screen or the like for a user to make various settings for the digital camera 100. The display monitor 130 can include a liquid crystal display device or an organic EL device, for example.

As shown in FIGS. 2 and 3, the digital camera 100 of the present embodiment is configured to be movable so that the position of the display monitor 130 can be changed. In the example in FIG. 2, the display monitor 130 is in a position where the display screen is toward the back surface side (−Z side) of the digital camera 100. This position of the display monitor 130 is hereinafter referred to as a "normal position". In the example in FIG. 3, the display monitor 130 is in a position where the display screen is toward the front surface side (+Z side) of the digital camera 100, that is, the subject side. This position of the display monitor 130 is hereinafter referred to as a "selfie position".

The magnetic sensor 132 is an example of a detector that detects whether the display monitor 130 is in the normal position or the selfie position. The magnetic sensor 132 outputs, to the controller 135, a detection signal indicating the detection result of the position of the display monitor 130, for example.

As an example of the movable display monitor 130, a vari-angle type or a tilt type can be used. For example, a hinge 131 that rotatably connects the display monitor 130 to the body of the digital camera 100 is provided. The magnetic sensor 132 is provided inside the hinge 131, for example, composing of a switch or the like having two states corresponding to FIGS. 2 and 3.

The acceleration sensor 137 detects, for example, one or more accelerations of the three axial directions X, Y, and Z, and outputs a detection signal to the controller 135. The acceleration sensor 137 is an example of an attitude detector that detects whether the attitude of the digital camera 100 is in horizontal orientation as illustrated in FIG. 2 or in vertical orientation as illustrated in FIG. 4 based on the detection state of gravitational acceleration.

The operation member 150 is a general term for hard keys such as operation buttons and operation levers provided on the exterior of the digital camera 100, and receives operations by a user. For example, the operation member 150 includes a release button, a mode dial, a touch panel, a cursor button, and a joystick. When receiving an operation by the user, the operation member 150 transmits an operation signal corresponding to the user operation to the controller 135. As shown in FIG. 2, the operation member 150 includes a release button 151, selection button 152, enter button 153, function button 154, touch panel 155 and the like, for example.

The controller 135 entirely controls the whole operation of the digital camera 100. The controller 135 includes a CPU and the like, and a predetermined function is implemented with the CPU executing a program (software). The controller 135 may include a processor including a dedicated electronic circuit designed to implement a predetermined function instead of the CPU. That is, the controller 135 can be implemented with various processors such as a CPU, an MPU, a GPU, a DSP, an FPGA, and an ASIC. The controller 135 may include one or a plurality of processors. In addition, the controller 135 may be integrated in one semiconductor chip together with the image processing engine 120 and the like.

The buffer memory 125 is a recording medium that functions as a work memory for the image processing engine 120 and the controller 135. The buffer memory 125 is implemented by a dynamic random-access memory (DRAM) or the like. The flash memory 145 is a non-volatile recording medium. Although not shown, the controller 135 may include various internal memories and may incorporate, for example, a ROM. The ROM stores various programs to be executed by the controller 135. The controller 135 may incorporate a RAM that functions as a working area of the CPU.

The card slot 140 is a means into which a detachable memory card 142 is inserted. The card slot 140 can connect the memory card 142 electrically and mechanically. The memory card 142 is an external memory including a recording element such as a flash memory inside. The memory card 142 can store data such as image data generated by the image processing engine 120.

The communication module 160 is a communication module (circuit) that performs data communication conforming to the communication standard such as IEEE 802.11, Wi-Fi standard, or the like. The digital camera 100 can communicate with other apparatuses via the communication module 160. The digital camera 100 may communicate directly with other apparatuses via the communication module 160, may communicate via an access point. The communication module 160 may be connectable to a communication network such as the Internet.

The microphone 161 is an example of a sound collector that collects sound. The microphone 161 converts the collected sound into an analog signal being an electric signal and outputs the signal. The microphone 161 of the present embodiment includes three microphone devices 161L, 161C, and 161R. The microphone 161 may include two, or four or more microphone devices.

The A/D converter 165 for the microphone converts the analog signal from the microphone 161 into audio data in a digital signal. The A/D converter 165 for the microphone is an example of an audio input device in the present embodiment. The microphone 161 may include a microphone device disposed outside the digital camera 100. In this case, the digital camera 100 includes, as the audio input device, an interface circuit for the external microphone.

The audio processing engine 170 receives the audio data output from the audio input device such as the A/D converter 165 for the microphone and performs various kinds of audio processing on the received audio data. The audio processing engine 170 is an example of an audio processor in the present embodiment.

The audio processing engine 170 of the present embodiment includes a beam former 172 and a gain adjuster 174 as shown in FIG. 1, for example. The beam former 172 realizes a function of controlling the directivity of sound. Details of the beam former 172 will be described below. The gain adjuster 174 performs multiplication processing of multiplying the input audio data by a sound collection gain set by, for example, the controller 135, to amplify the audio. The gain adjuster 174 may perform processing of multiplying the input audio data by a negative gain to suppress the audio. The gain adjuster 174 may further have a function of changing the frequency characteristic and stereo characteristic of the input audio data. Details of setting the sound collection gain will be described later.

1-1-1. Beam Former

Details of the beam former 172 in the present embodiment will be described as follows.

Figure 5:
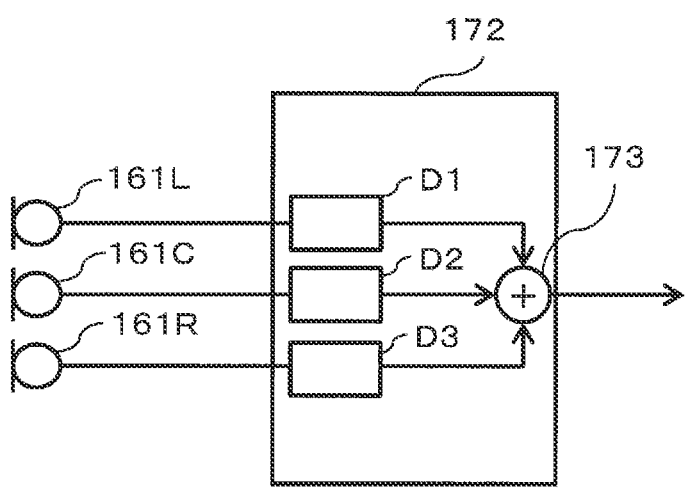
FIG. 5 is a diagram illustrating a configuration of a beam former 172 in the digital camera 100.

The beam former 172 performs beam forming for controlling the directivity of the sound collected by the microphone 161. FIG. 5 shows a configuration example of the beam former 172 in the present embodiment.

As shown in FIG. 5, the beam former 172 includes filters D1 to D3 and an adder 173, for example. The beam former 172 adjusts the delay period of the sound collected by each of the microphone devices 161L, 161C, and 161R, and outputs the weighted sum of each. The beam former 172 can control the direction and range of the sound collection directivity of the microphone 161, and set the physical range in which the microphone 161 collects sound.

The beam former 172 outputs one channel with one adder 173 in the drawing, but the beam former 172 may include two or more adders and may be configured to have outputs different for each channel such as stereo outputs. The beam former 172 may use a subtracter in addition to the adder 173 to form a directivity that has a dead angle. The dead angle is a direction having a particularly low sensitivity in a specific direction. The beam former 72 may perform adaptive beam forming with which the beam former 72 changes processing adapting to the environment. The beam former 172 may apply different processing to the audio signal depending on the frequency band of the audio signal.

FIG. 5 shows an example in which the microphone devices 161L, 161C, and 161R are linearly arranged, but the arrangement of the microphone devices is not limited to this. For example, even when the microphone devices 161L, 161C, and 161R are arranged in a triangular shape, the sound collection directivity of the microphone 161 can be controlled by appropriately adjusting the delay periods and weights of the filters D1 to D3. The beam former 172 may apply a known method to the control of the sound collection directivity. For example, processing of forming the directivity and processing of suppressing the noise of the audio may be performed using an audio processing technique such as OZO Audio.

The sound collection area of the digital camera 100 that can be set by the beam former 172 as described above will be described.

1-1-2. Sound Collection Area

FIGS. 6A to 6D show examples of sound collection areas defined as to the digital camera 100. FIGS. 6A to 6D illustrate the sound collection areas with fan-shaped regions of a circle centered on the digital camera 100. In the digital camera 100 of the present embodiment, the horizontal angle-of-view direction coincides with the direction in which the microphone devices 1618, 161C, and 161R are aligned.

FIG. 6A shows a "front center sound collection area" 41 which directs the sound collection area in front of the digital camera 100 (i.e., in the shooting direction) in an angle range 401 (e.g., 70°). FIG. 6B shows a "left half sound collection area" 42 which directs the sound collection area to the left of the digital camera 100 in the angle range 401. FIG. 6C shows a "right half sound collection area" 43 which directs the sound collection area to the right of the digital camera 100 in the angle range 401. FIG. 6D shows a "front sound collection area" 44 which directs the sound collection area in front of the digital camera 100 in an angle range 402 larger than the angle range 401 (e.g., 160°). These sound collection areas 41 to 44 are examples of a plurality of predetermined areas in the present embodiment. The angle ranges 401 and 402 are examples of a first angle range and a second angle range.

The digital camera 100 of the present embodiment uses the front center sound collection area 41 in FIG. 6A when the subject is located at the central portion of the captured image. When the subject is located in the left half of the captured image, the left half sound collection area 42 in FIG. 6B is used. When the subject is located in the right half of the captured image, the right half sound collection area 43 in FIG. 6C is used. When the subject is located in the whole captured image, the front sound collection area 44 in FIG. 6D is mainly used.

Figure 11A:
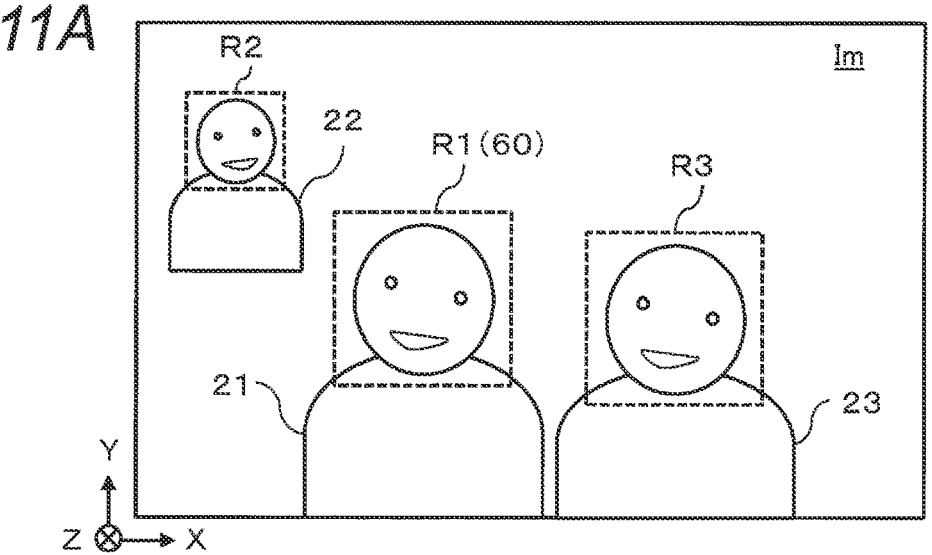
FIGS. 11A to 11C are diagrams for illustrating an outline of the operation of the focus mode in the digital camera 100.
Figure 11B:
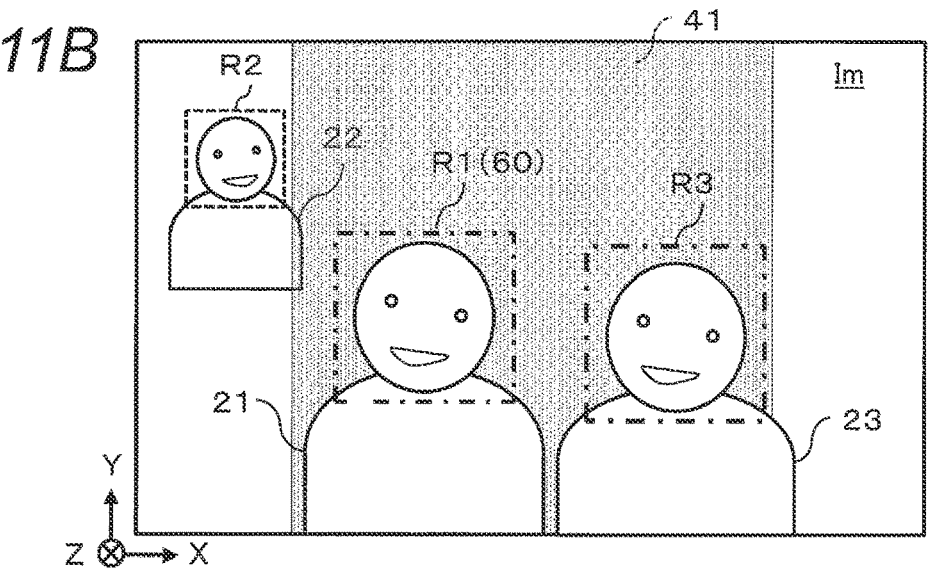

In the example in FIG. 11B, since the subjects R1 and R3 as the sound collection targets are located in the central portion of the captured image, the front center sound collection area 41 is used. In the example in FIG. 11C, since the subjects R1 and R2 as the sound collection targets are located in the left half of the captured image, the left half sound collection area 42 is used.

In the sound collector of the imaging apparatus such as the microphone 161 of the digital camera 100, the number and arrangement of microphone devices are constrained by circumstances such as the mounting space of the devices. For example, for a shooting scene in which a user wants to record audios for a plurality of subjects, there are cases where the sound collection directivity cannot be sufficiently narrowed due to the limitation on the number of microphone devices. Even in such a case, the digital camera 100 according to the present embodiment can provide a sound collection area in line with the user's intention by preliminarily defining a sound collection area assuming a shooting scene of the user, and determining the sound collection area with face recognition.

1-1-3. Microphone Setting

The setting regarding the sound collection area of the microphone 161 in the digital camera 100 will be described with reference to FIGS. 7 to 8.

Figure 7:
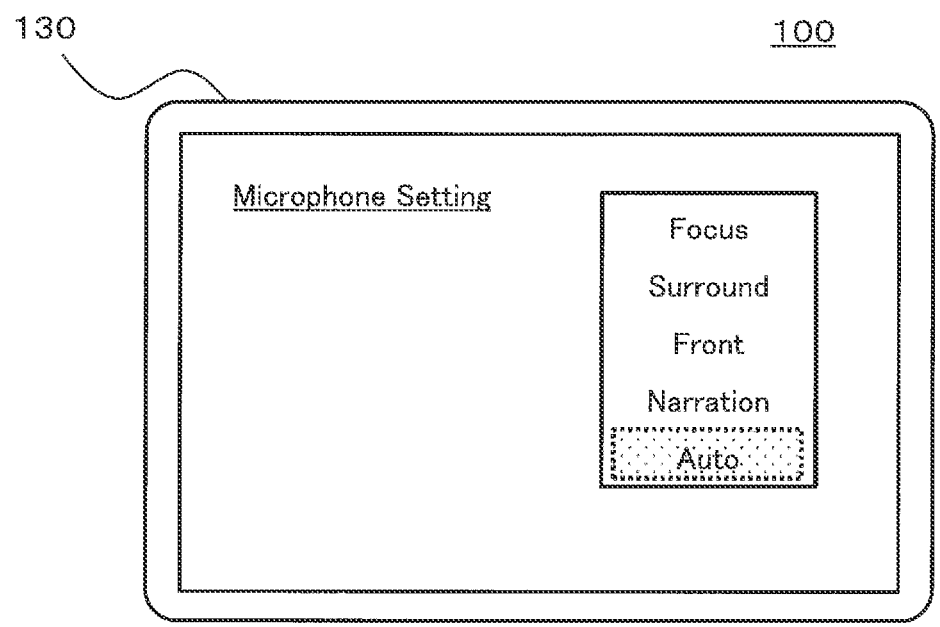
FIG. 7 is a diagram showing a display example of a setting menu in the digital camera 100.

FIG. 7 shows a display example of a setting menu in the digital camera 100. For example, the digital camera 100 of the present embodiment has modes of "auto", "surround", "focus", and "narration" as operation modes for controlling the sound collection area of the microphone 161 (i.e., sound collection modes), as shown in FIG. 7.

Figure 8A:
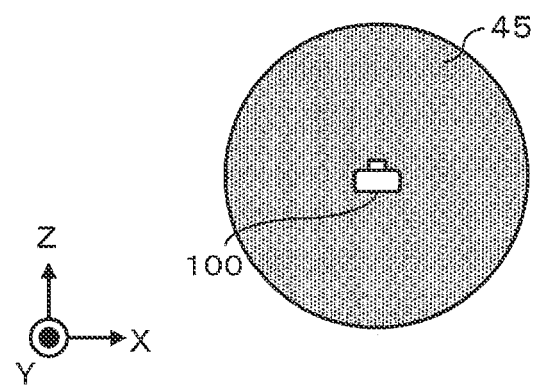
FIGS. 8A to 8C are diagrams illustrating further sound collection areas in the digital camera 100.
Figure 8B:
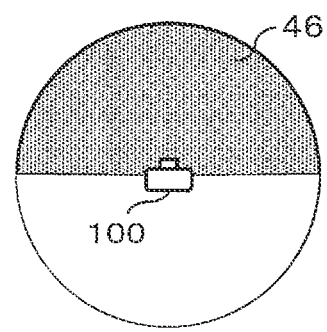
Figure 8C:
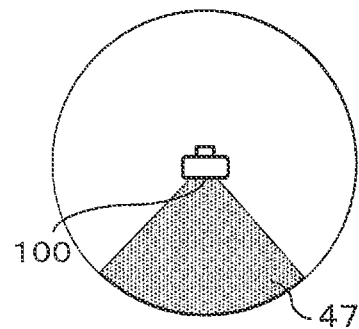

The focus mode is an operation mode in which the directivity of the microphone 161 is automatically changed and the sound collection area is adjusted in linkage with the face recognition and the angle of view by the digital camera 100. For example, the focus mode can be implemented by switching and using the various sound collection areas 41 to 44 described above. Daringly and roughly implementing the focus mode with the four sound collection areas 41 to 44 makes it possible to avoid a situation in which the sound collection directivity changes frequently due to a slight movement of the subject, and to reduce the annoyance in the user's auditory sensitivity. FIGS. 8A to 8C illustrate further sound collection areas in the digital camera 100.

FIG. 8A illustrates a sound collection area 45 in the surround mode. The surround mode is an operation mode for collecting a wide range of sounds over the left, right, front, and back of the digital camera 100. The sound collection area 45 in the surround mode has an angle range such as the whole circumference 360° of the XZ plane, fox example.

FIG. 8B illustrates a sound collection area 46 in the front mode. The front mode is an operation mode for collecting the sound in front of the digital camera 100. The sound collection area 46 in the front mode directs to the +Z side from the digital camera 100, and has an angle range of, for example, equal to or more than the above-described front sound collection area 44.

FIG. 8C illustrates a sound collection area 47 in the narration mode. The narration mode is an operation mode for collecting the sound behind the digital camera 100. The sound collection area 47 in the narration mode is formed from the digital camera 100 toward the −Z side. When it is detected that the display monitor 130 is in the selfie position with the narration mode being set, the digital camera 100 may perform the operation of the focus mode.

The auto mode is an operation mode in which the directivity of the microphone 161 is automatically changed and the sound collection area is adjusted in linkage with the image shooting state of the digital camera 100. The image shooting state of the digital camera 100 includes, for example, whether it is a selfie, and whether it is vertical shooting or horizontal shooting, in addition to face recognition or the like used in the focus mode.

The microphone setting for setting various sound collection modes as described above is provided as one of moving image menus in the setting menu of the digital camera 100, for example. The user can select a desired sound collection mode from the setting menu by the touch operation of the touch panel 155 or the pressing operation of the various buttons 152 and 153. In addition, the microphone setting may be assigned to the function button 154 or the like in advance. The setting of a specific sound collection mode such as the auto mode may be assigned to the function button 154 or the like.

1-2. Operation

The operation of the digital camera 100 configured as described above will be described. In the following, the operation of the digital camera 100 during shooting a moving image will be described.

The digital camera 100 sequentially captures a subject image formed via the optical system 110 with the image sensor 115 to generate captured image data. The image processing engine 120 performs various kinds of processing on the captured image data generated by the image sensor 115 to generate image data, and records the image data in the buffer memory 125. In addition, the face recognizer 122 of the image processing engine 120 detects the region of the subject based on the image indicated by the captured image data and outputs detection information to the controller 135, for example.

The digital camera 100 of the present embodiment has a face recognition mode. The face recognition mode is an operation mode for performing face detection in the captured image that is input into the face recognizer 122 by image recognition processing, to identify the subject to be the target of autofocus (AF) control based on the detection information.

Concurrently with the above imaging operation, the digital camera 100 collects sound with the microphone 161. The audio processing engine 170 processes the audio data of the sound collection result from the A/D converter 165 for the microphone. The audio processing engine 170 records the processed audio data Aout in the buffer memory 125.

The controller 135 synchronizes the image data received from the image processing engine 120 and the audio data received from the audio processing engine 170 via the buffer memory 125, and records a moving image in the memory card 142. In addition, the controller 135 sequentially causes the display monitor 130 to display a through image. The user can check the composition of the shooting and the like at any time from the through image on the display monitor 130. The operation of moving image shooting is started/ended according to the user operation in the operation member 190.

For the moving image shooting of the digital camera 100 as described above, various cases may be expected. For example, the moving image shooting may be performed with user's intention of focusing attention on a group of subjects who have conversations within the group, such as a cameraman and his companion. In this case, user's intention may be also on audios, for clearly collecting the conversation of the subject group.

The digital camera 100 of the present embodiment detects subjects based on the detection information by the face recognizer 122 in the image processing engine 120 as an exemplary operation of the focus mode as discussed above. When the AF target subject is determined, the audio processing engine 170 executes processing of emphasizing the audios to be collected from the subject and subjects around the subject. Thus, the face recognition of the image processing engine 120 is cooperated with the audio emphasis and the like of the audio processing engine 170, to accurately achieve sound collection that emphasizes the sound from the group of subjects having the conversation as described above.

Furthermore, as the operation of the auto mode, the digital camera 100 of the present embodiment realizes more appropriate sound collection control according to various shooting states in addition to the operation of the focus mode as described above. The outline of the operation of the auto mode will be described with reference to FIG. 9.

FIG. 9 illustrates the correspondence between the auto mode and various sound collection modes of the digital camera 100. The digital camera 100 in the auto mode performs the same operation as in the focus mode when a face is recognized in a horizontal shooting state, for example.

On the other hand, when no face is recognized, for example, in the case of non-selfie (see FIG. 2), the digital camera 100 operates in the same manner as in the surround mode, that is, uses the sound collection area 45 in the surround mode. In addition, in the case where no face is recognized and selfie is taken (see FIG. 3), the digital camera 100 operates in the same manner as in the front mode.

In addition, in the case of vertical shooting, the operation at the time when no face is recognized is the same as in the case of horizontal shooting described above. On the other hand, when a face is recognized in vertical shooting, the digital camera 100 of the present embodiment operates in the same manner as in the front mode instead of the focus mode.

According to the operation of the auto mode as described above, as shown in FIG. 9, combining the operations of various sound collection modes according to various shooting states makes it possible to easily achieve appropriate sound collection control in each shooting state.

1-2-1. Operation of Focus Mode

An outline of the operation of the focus mode in the digital camera 100 according to the present embodiment will be described with reference to FIGS. 4 and 5A to 5C.

Figure 10:
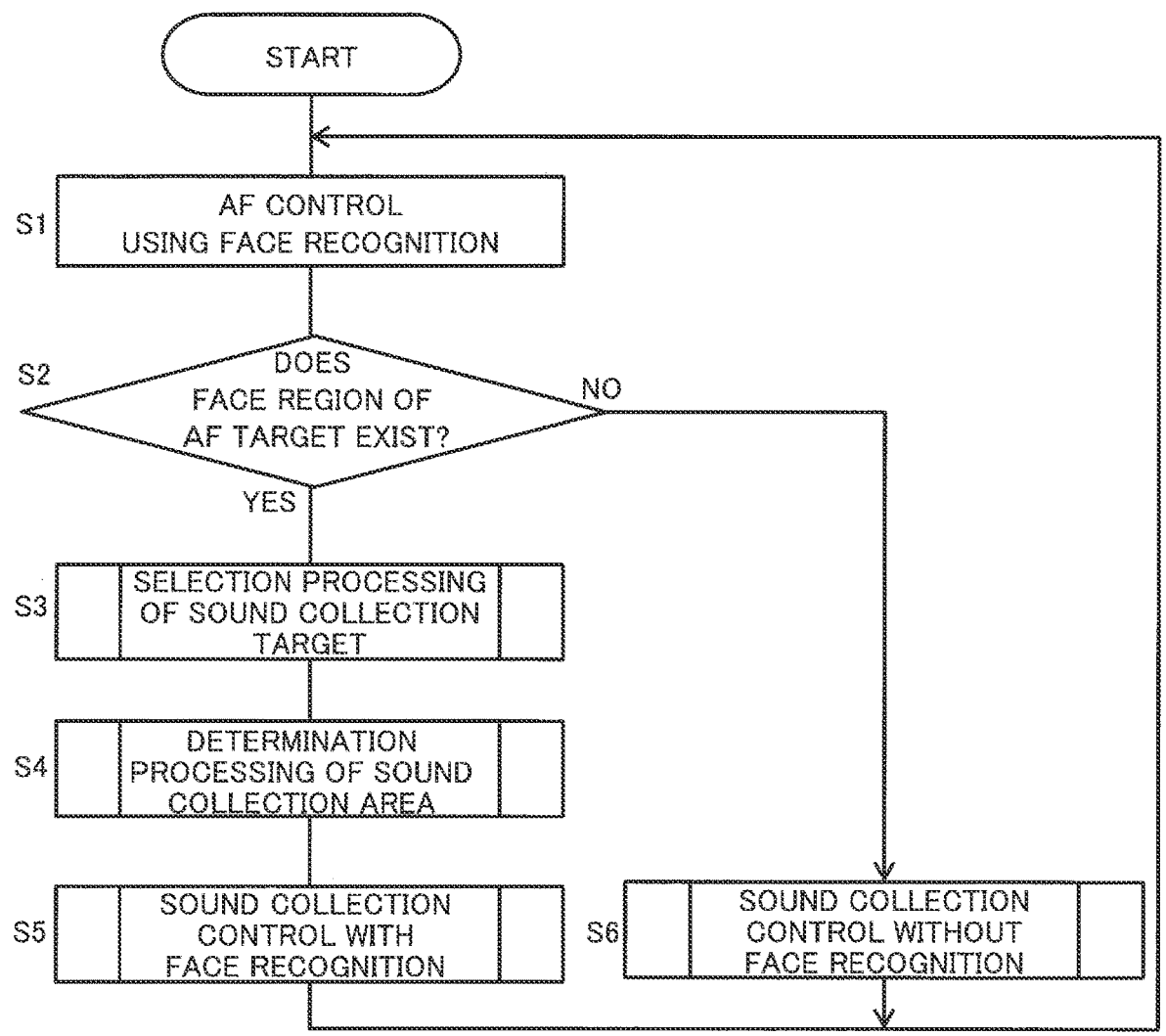
FIG. 10 is a flowchart illustrating an operation of a focus mode in the digital camera 100 according to the first embodiment.
Figure 11C:
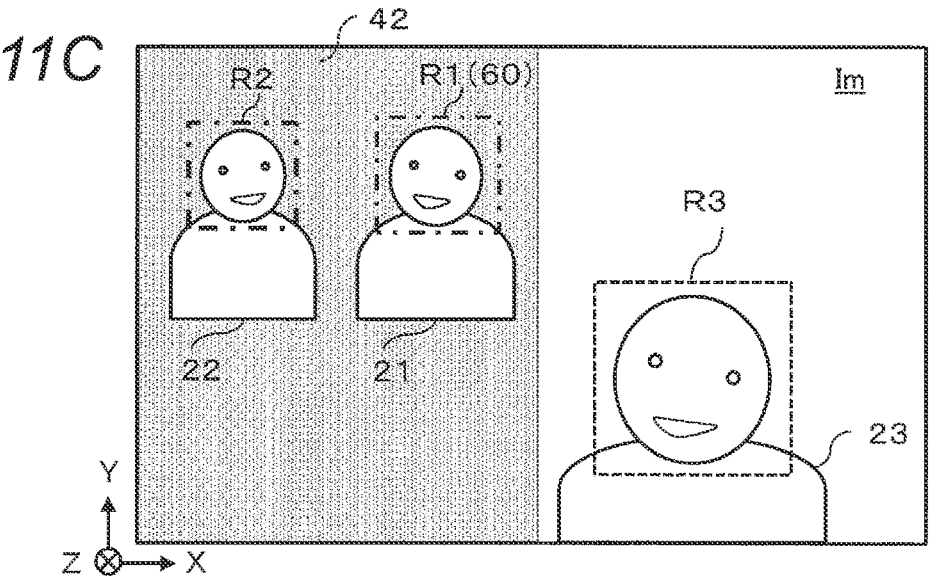

FIG. 10 is a flowchart illustrating the operation of the focus mode in the digital camera 100 according to the present embodiment. Each processing shown in the flowchart in FIG. 10 is repeatedly performed at a predetermined period with the digital camera 100 being set to the focus mode, for example. The predetermined period is, for example, a frame period of a moving image. FIGS. 11A to 11C are diagrams for illustrating the outline of the operation of the focus mode in the digital camera 100 according to the present embodiment.

The controller 135 identifies the AF target based on the detection information by the face recognizer 122 and performs AF control (S1). The AF target indicates a region on the image of a subject which is the target of the AF control. FIG. 11A illustrates a captured image Im including face regions R1, R2, and R3 each of which indicates a region in which a subject is detected in the detection information by the face recognizer 122. The face regions R1, R2, and R3 are examples of the subject regions in the present embodiment. For example, the face region R1 is identified as a face region 60 of the AF target.

Next, the controller 135 determines whether or not there exists a face region identified as the AF target (S2). Specifically, the controller 135 determines whether or not a face region is detected and the AF target is the face region.

When there is the face region 60 of the AF target (YES in S2), the controller 135 performs processing of selecting a sound collection target of the microphone 161 from subjects in the detection information (S3). The sound collection target is a subject to be a target whose sound is emphatically collected with the microphone 161. The face region R1 (60) identified as the AF target is a sound collection target. FIG. 11B shows an example in which the face regions R1 and R3 are determined as the sound collection targets, while the face region R2 is not determined as the sound collection target, based on the detection information shown in FIG. 11A.

In the selection processing of the sound collection target (S3), the digital camera 100 of the present embodiment determines the face region R3, which indicates substantially the same face size as the face region R1 (60) of the AF target in the captured image Im, as an additional sound collection target in addition to the face region R1. On the other hand, the face region R2 having a size different from that of the face region R1 is eliminated from the sound collection target. Thus, the group of subjects talking with each other can be set as sound collection targets by reflecting that a person 21 and a person 23 are at similar distances from the digital camera 100 (i.e., the difference in the distance in the Z-axis direction is small) and that a person 22 is at a different distance. Details of the selection processing of the sound collection target (S3) will be described later.

Next, the controller 135 performs processing of determining a sound collection area based on determined sound collection targets (S4). The determination processing of the sound collection area (S4) determines a sound collection area including all the determined sound collection targets. In the example in FIG. 11B, the sound collection area is determined to the front center sound collection area 41 (FIG. 6A) so as to include the face regions R1 and R3 as the sound collection targets. Details of the determination processing of the sound collection area (S4) will be described later.

Next, the controller 135 controls sound collection with face recognition based on the determined sound collection targets and sound collection area. The sound collection control with face recognition (S5) is performed by setting the sound collection target, the sound collection area, and sound collection parameters including sound collection gain, which are determined by the controller 135, into the audio processing engine 170. The audio processing engine 170 realizes a sound collection directivity and a sound collection gain corresponding to the sound collection parameters.

On the other hand, when there is no face region 60 of the AF target (NO in S2), such as no face region being detected during operation in the face recognition mode, the controller 135 performs sound collection control without face recognition (S6). Details of the sound collection control with or without face recognition (S5 or S6) will be described later.

The controller 135 performs the sound collection control in step S5 or S6, and then repeats the processing in and after step S1.

According to the above processing, the digital camera 100 of the present embodiment selects the sound collection target from subjects detected by face recognition, determines the sound collection area that includes all the sound collection targets, and performs sound collection control with face recognition. Thus, sound can be emphatically picked up from a group of subjects talking with each other, for example.

In the AF control by face recognition (S1), the identification of AF targets based on the detection information can be performed by, for example, displaying a frame which indicates a face region on the through image displayed on the display monitor 130, and inputting a user operation to select the frame with the operation member 150.

FIG. 11C shows an example of the captured image Im when the persons 21 to 23 are in positions different from those in FIGS. 11A and 11B. Similarly to the example in FIG. 11B, the digital camera 100 first identifies the face region R1 as the face region 60 of the AF target (S1) and determines the face region R1 as the sound collection target, for example. In the example in FIG. 11C, the selection processing of the sound collection target (S3) determines the face region R2 having the similar size as the face region R1 on the captured image Im as the sound collection target and eliminates the face region R3 from the sound collection target. The determination processing of the sound collection area (S4) determines the left half sound collection area 42 (FIG. 6B), which includes the face regions R1 and R2 determined as the sound collection targets, as the sound collection area. The sound collection control with face recognition (S5) is performed by setting the sound collection parameters so that the sound of the persons 21 and 22 can be clearly collected by controlling the directivity to the left half sound collection area 42.

1-2-2. Selection Processing of Sound Collection Target

Details of the selection processing of the sound collection target in step S3 in FIG. 10 will be described with reference to FIGS. 12 to 13C.

Figure 12:
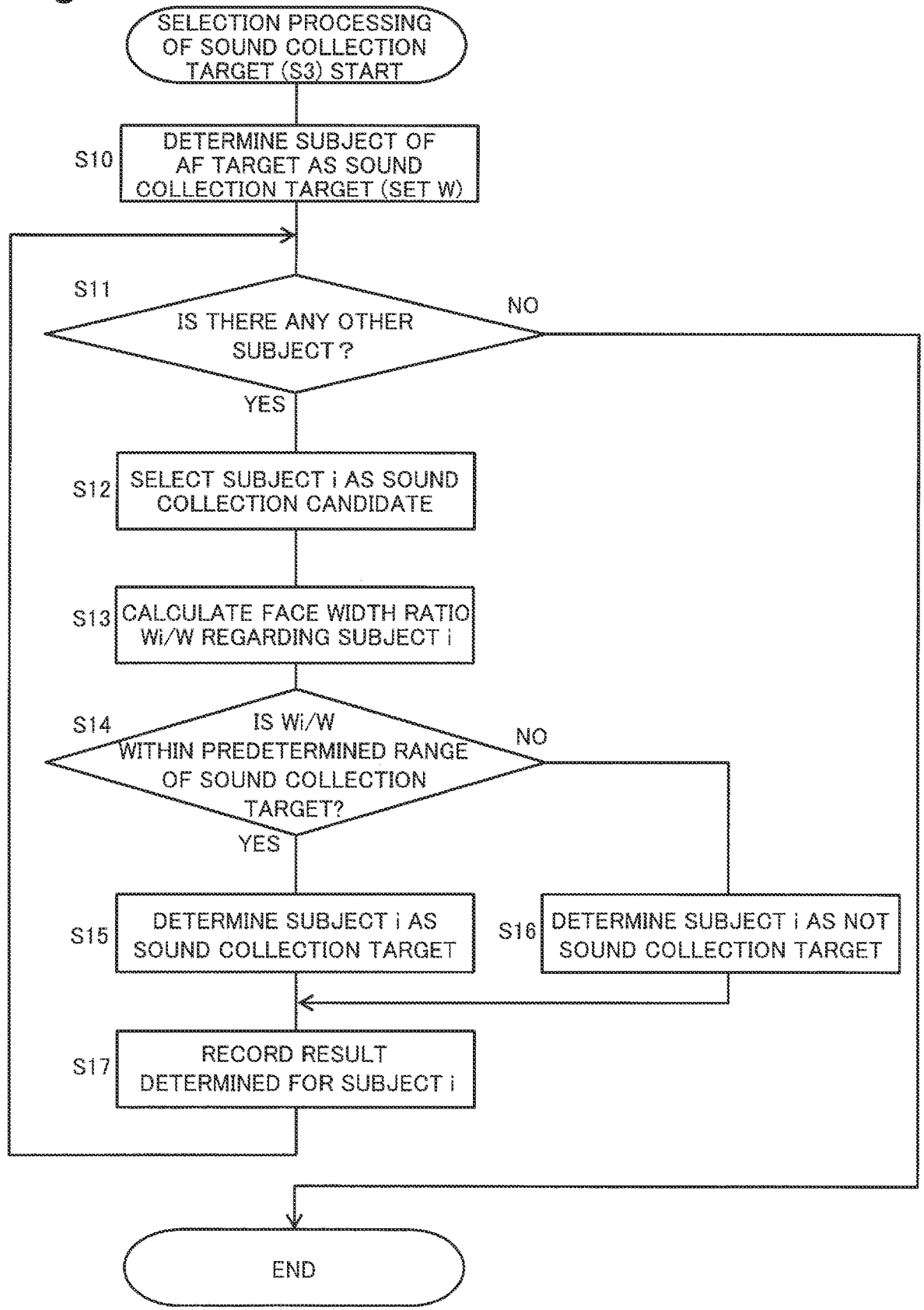
FIG. 12 is a flowchart illustrating selection processing of a sound collection target (S3 in FIG. 10) of the digital camera according to the first embodiment.

FIG. 12 is a flowchart illustrating the selection processing of the sound collection target (S3) of the digital camera 100. Each process according to the flowchart shown in FIG. 12 is performed by, for example, the controller 135 of the digital camera 100, when the process proceeds to YES in step S11 in FIG. 10.

Figure 13A:
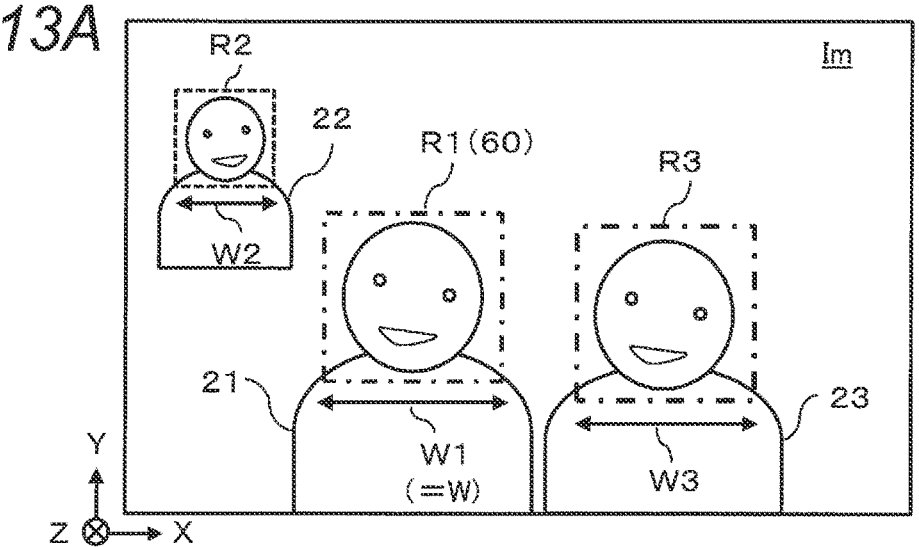
FIGS. 13A to 13C are diagrams for illustrating the selection processing of a sound collection target of the digital camera 100.
Figure 13B:
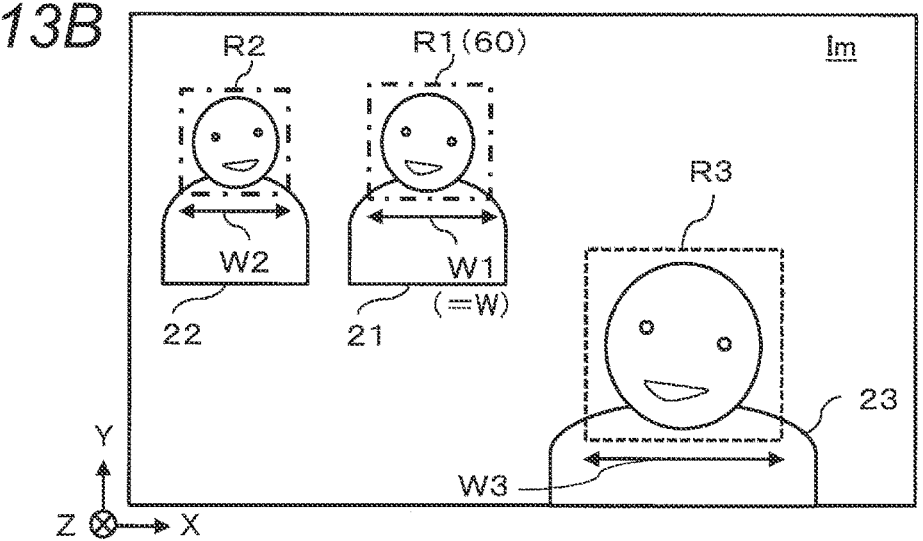
Figure 13C:
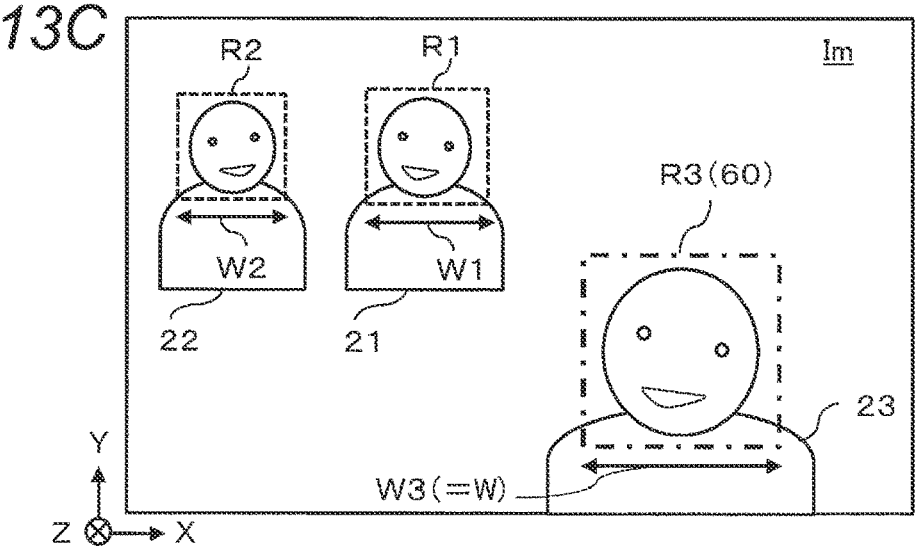

FIGS. 13A to 13C are diagrams for illustrating the selection processing of the sound collection target (S3) in the digital camera 100. In the following, the operation of determining the sound collection target will be described in the example in FIGS. 11A and 11B.

In the flowchart in FIG. 12, the controller 135 determines, as the sound collection target, a subject corresponding to the face region of the AF target identified in step S1 in FIG. 10 (S10). At this time, the controller 135 sets the size of the face region of the AF target (i.e., the face width W) as a reference for selecting the sound collection target from other subjects based on the detection information received from the face recognizer 122.

FIG. 13A illustrates a case where the sound collection target is selected in the examples in FIGS. 11A and 11B. Face widths W1, W2, and W3 respectively indicate the sizes of the face regions R1, R2, and R3 in the captured image Im, with widths in the X-axis direction. In the example in FIG. 13A, the controller 135 sets the face width W1 of the face region R1 of the AF target to a reference face width W (S10). The set face width W is held, for example, in a RAM of the controller 135.

Next, the controller 135 determines whether there is a detected subject other than the AF target (S11). Specifically, the controller 135 determines whether the detection information by the face recognizer 122 includes a face region other than the face region of the AF target.

When there is a detected subject other than the AF target (YES in S11), the controller 135 selects one subject i as a sound collection candidate that is a candidate for the sound collection target (S12). In the example in FIG. 13A, from the detection information, the face regions R2 and R3 other than the face region R1 of the AF target are sequentially selected in each step S12 in association with the subject i of the sound collection candidate.

The controller 135 performs calculation of comparing the face width Wi of the selected subject i with the reference face width W (S13). Specifically, the controller 135 calculates the ratio Wi/W of the face width Wi of the subject i to the reference face width W. In the example in FIG. 13A, when the face region R2 is selected as a sound collection candidate (S12), the ratio W2/W for the face width W2 is calculated (S13).

The controller 135 determines whether the ratio Wi/W between the face width Wi of the sound collection candidate and the reference face width N is within a predetermined range (S14). The predetermined range is defined by an upper limit which is larger than "1" and a lower limit which is smaller than "1" from the viewpoint of defining the range in which the face width Wi of the sound collection candidate is regarded as relatively the same as the reference face width Wi, for example. For setting the predetermined range, a user interface may be provided. For example, the predetermined range set by the user using the operation member 150 may be held in the buffer memory 125 or the like.

When determining that the ratio Wi/W of the face width is within the predetermined range (YES in S14), the controller 135 determines that the subject i is the sound collection target (S15).

On the other hand, when determining that the ratio Wi/N of the face width is not within the predetermined range (NO in S14), the controller 135 determines that the subject i is not the sound collection target (S16). In the example in FIG. 13A, the ratio W2/W is less than the lower limit of the predetermined range. Thus, it is determined that the face region R2 is not the sound collection target.

After determining whether or not the subject i is the sound collection target (S15 or S16), the controller 135 records information on the result determined for the subject i in the buffer memory 125 (S17), for example. Next, the controller 135 performs the processing in and after step S11 again on a subject other than the subject already selected as the sound collection candidate.

In the example in FIG. 13A, the face region R3 is included in the detection information in addition to the face region R2 (YES in S11). When selecting the subject corresponding to the face region R3 (S12), the controller 135 calculates the ratio W3/W of the face width W3 to the reference face width W (S13), as in the case of the face region R2. In the example in FIG. 13A, the ratio W3/W is calculated to be near "1". The controller 135 determines that the calculated ratio W3/W of the face width is within the predetermined range of the sound collection target (YES in S14), and determines the subject corresponding to the face region R3 as the sound collection target (S15).

The controller 135 repeats the processing of steps S11 to S17 until every subject is selected as a sound collection candidate (NO in step S11). Thereafter, the controller 135 ends the selection processing of the sound collection target (S3), and proceeds to step S4 in FIG. 10.

According to the above processing, the subjects detected by face recognition is checked by comparing the relative sizes of the face regions R2 and R3 with the face region R1 identified as the AF target as the reference. Thus, a subject whose relative size of the face region R3 is substantially the same as that of the face region R1 of the AF target can be selected and determined as the sound collection target.

FIG. 13B illustrates a case where the sound collection target is selected in the example in FIG. 11C. In the example in FIG. 13B, the face region R1 is identified as the AF target as in the example in FIG. 13A. Therefore, the controller 135 determines the face region R1 as the sound collection target and sets the face width W1 to the reference face width W (S10).

In the example in FIG. 13B, the face width W2 of the face region R2 is substantially the same as the face width W (=W1) of the reference. On the other hand, the face width W3 of the face region R3 is larger than the other face widths W1 and W2. In the present example, the controller 135 determines that the ratio W2/W within the predetermined range (YES in S14), and determines the subject in the face region R2 as the sound collection target (S15). On the other hand, since the ratio W3/W is greater than the upper limit of the predetermined range (NO in S14), it is determined that the subject in the face region R3 is not set as the sound collection target (S16). Therefore, the sound collection target of the present example is determined to be the two subjects corresponding to the face regions R1 and R2 (see FIG. 11C).

FIG. 13C illustrates a case where the face region R3 is identified as the face region 60 of the AF target (S1 in FIG. 10) in the captured image Im similar to that in FIG. 11C. The controller 135 determines the face region R3 as the sound collection target, and sets the face width W3 to the reference face width W (S10). In the example in FIG. 13C, since each of the ratios W2/W and W1/W is less than the lower limit of the predetermined range (NO in S14), it is determined that the subjects corresponding to the face regions R1 and R2 are not the sound collection targets (S16). Therefore, the sound collection target of the present example is determined as one subject corresponding to the face region R3.

As described above, the digital camera 100 of the present embodiment determines, as the sound collection target, a subject having substantially the same size as the AF target from a plurality of subjects detected by image recognition. The determined sound collection target can be used for determining a sound collection area in line with the user's intention as described below.

1-2-3. Determination Processing of Sound Collection Area

Details of the determination processing of the sound collection area in step S4 in FIG. 10 will be described with reference to FIGS. 14 to 15C.

Figure 14:
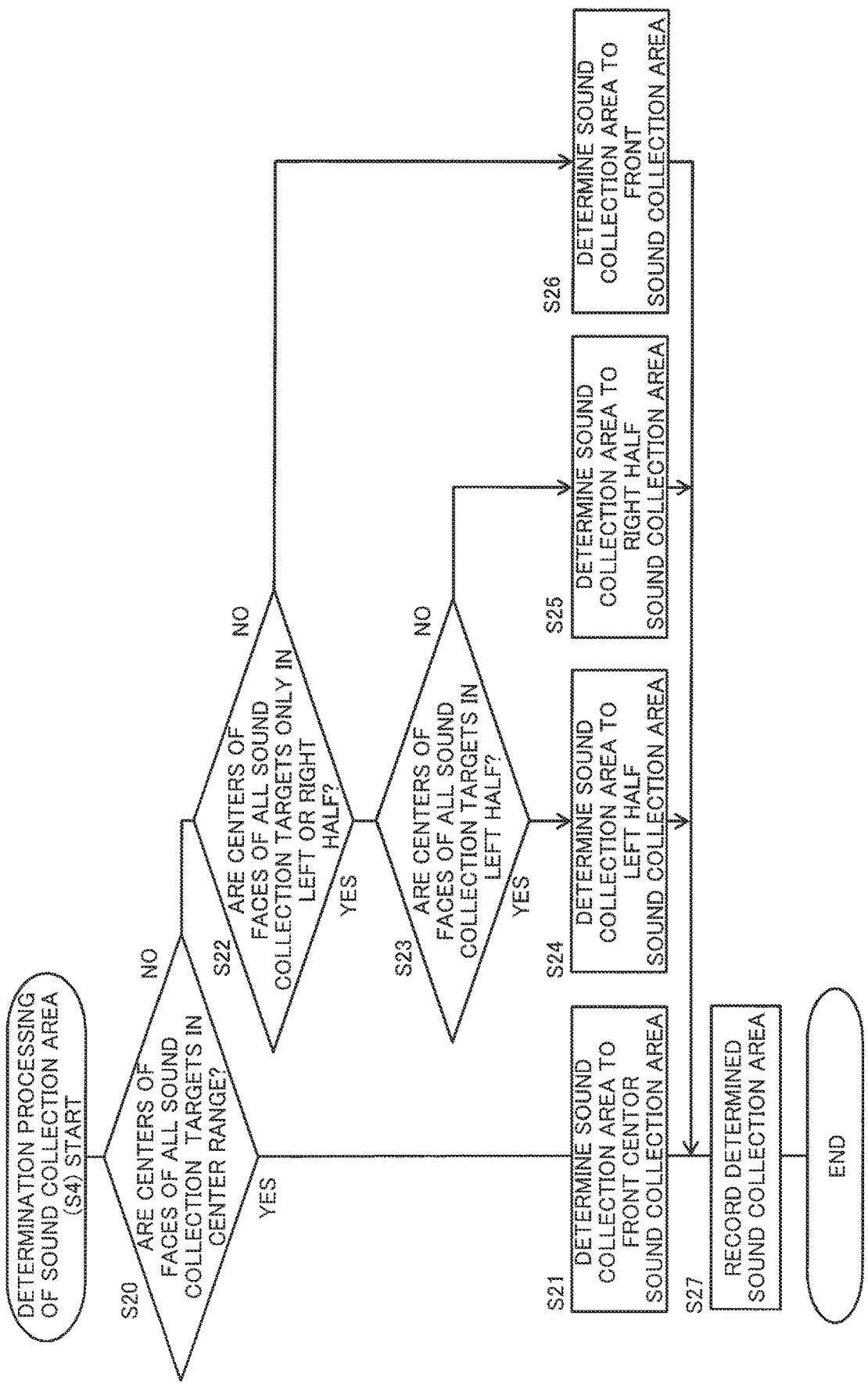
FIG. 14 is a flowchart illustrating determination processing of a sound collection area (S4 in FIG. 10) of the digital camera 100.

FIG. 14 is a flowchart illustrating the determination processing of the sound collection area (S4) in the digital camera 100 of the present embodiment. Each process according to the flowchart shown in FIG. 14 is performed by, for example, the controller 135 of the digital camera 100, after step S3 in FIG. 10 is performed.

Figure 15A:
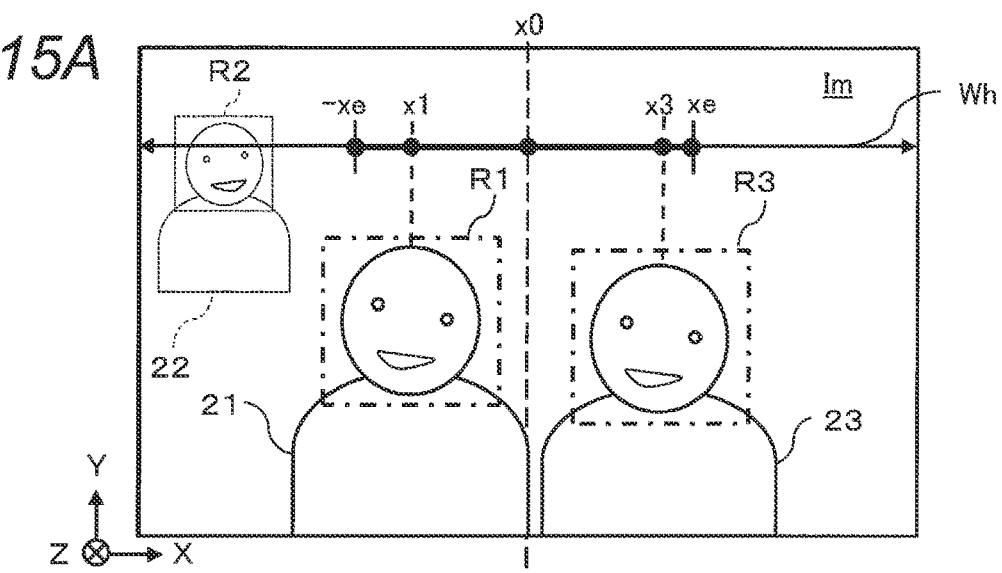
FIGS. 15A to 15C are diagrams for illustrating the determination processing of a sound collection area of the digital camera 100.
Figure 15B:
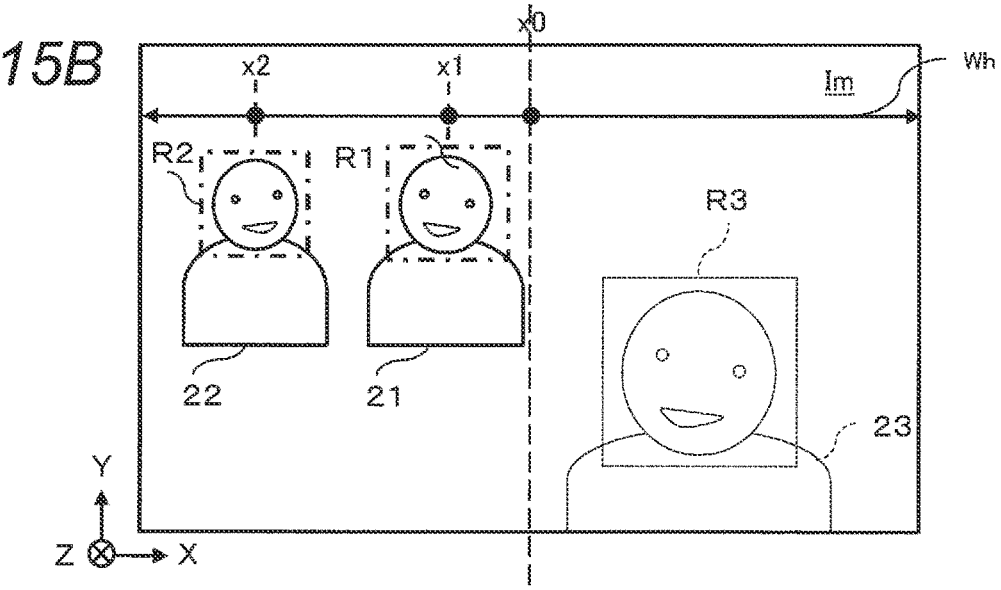
Figure 15C:
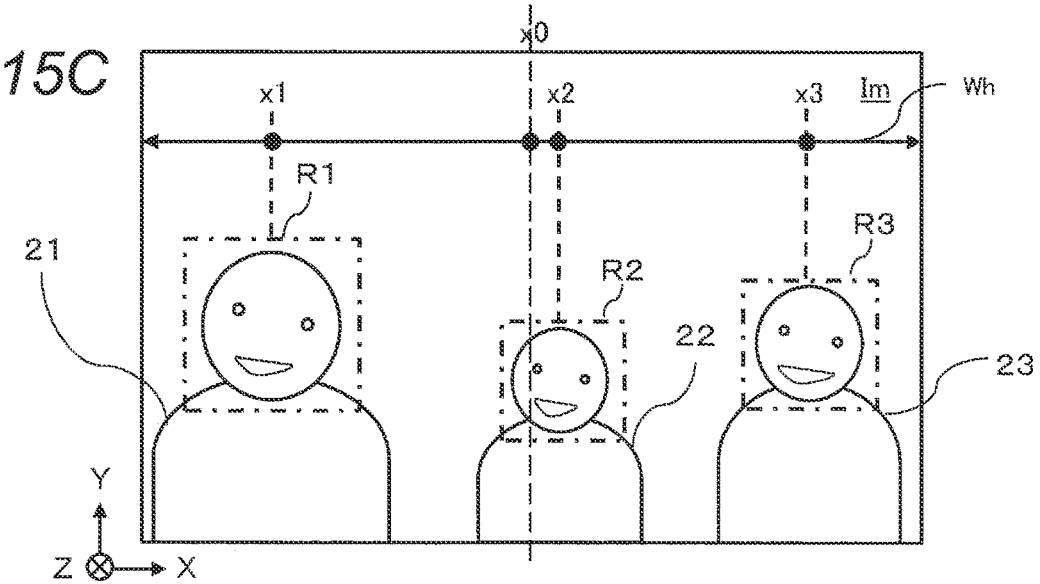

FIGS. 15A to 15C are diagrams for illustrating the determination processing of the sound collection area (S4) of the digital camera 100. FIGS. 15A and 15B illustrate the cases where the sound collection area is determined, subsequently to the examples in FIGS. 13A and 13B, respectively. FIG. 15C illustrates another case from those in FIGS. 15A and 15B. In FIGS. 15A to 15C, a center position x0 indicates the position of the center of the captured image Im in the X-axis direction, and an image width Wh indicates the width of the captured image Im in the X-axis direction. The image range is defined as a range (x0±xh) from −xh to xh on the X coordinate with reference to the center position x0 on the captured image Im. The X coordinate xh is defined by xh=Wh/2 (>0).

In the flowchart in FIG. 14, for all the sound collection targets, the controller 135 determines whether the position of the center or the like of the face region is in a center range of the captured image Im (S20). The center range is a range associated with the front center sound collection area 41 in the captured image Im.

For example, as shown in FIG. 15A, the center range is defined as a range (x0±xe) from −xe to xe on the X coordinate with reference to the center position x0 on the captured image Im. The X coordinate xe is defined by xe=xh×θe/θh (>0) based on a predetermined angle of view θe and a horizontal angle of view θh corresponding to the image width Wh, for example. The predetermined angle of view θe is set in advance from the viewpoint of including one person, for example, and is 30° or the like. The controller 135 acquires the current horizontal angle of view θh from the zoom magnification or the like of the zoom lens of the optical system 110, for example, and calculates the center range (x0±xe).

For wide-angle shooting in which the horizontal angle of view θh is large, the X coordinate xe is reduced and the center range (x0±xe) is narrow. On the other hand, for telephoto shooting in which the horizontal angle of view θh is small, the X coordinate xe is increased and the center range (x0±xe) is wide. Thus, the determination of the sound collection area corresponding to the physical range and distance to be shot can be easily achieved.

When the positions of the face regions of all the sound collection targets are within the center range (YES in S20), the controller 135 determines the sound collection area to the front center sound collection area 41 (S21). In the example in FIG. 15A, the sound collection targets correspond to the face regions R1 and R3. The center positions x1 and x3 of the respective face regions R1 and R3 are both within the range of (x0±xe) (YES in S20). Therefore, the sound collection area is determined as the front center sound collection area 41 (S21, see FIG. 11B).

On the other hand, when the position of at least one face region of the sound collection target is not within the center range (NO in S20), a sound collection area other than the front center sound collection area 41 is used. In this case, the controller 135 determines whether the positions of the face regions of all the sound collection targets are only in any one of the left half and the right half in the captured image Im (S22), for example. The left half range is a range in which the X coordinate is smaller than the center position x0 in the X-axis direction, and the right half range is a range in which the X coordinate is larger than the center position x0.

When the positions of the face regions of all the sound collection targets are only in the range of the left half or right half in the captured image Im (YES in S22), the controller 135 further determines whether the positions of the face regions of all the sound collection targets are within the left half range in the captured image Im (S23).

When the positions of the face regions of all the sound collection targets are within the range of the left half in the captured image Im (YES in S23), the controller 135 determines the sound collection area to the left half sound collection area 42 (S24). In the example in FIG. 15B, the sound collection targets correspond to the face regions R1 and R2. Since a position x1 of the face region R1 and a position x2 of the face region R2 are on the left side of (i.e., their X coordinates are smaller than) the center position x0 in the X-axis direction (YES in S23), the sound collection area is determined as the left half sound collection area 42 (S24, see FIG. 11C).

On the other hand, when the positions of the face regions of all the sound collection targets are within the right half and not within the left half of the captured image Im (NO in S23), the controller 135 determines the sound collection area to the right half sound collection area 43 (S25).

On the other hand, when the positions of the face regions of all the sound collection targets are within the right half and not within the left half of the captured image Im (NO in S23), the controller 135 determines the sound collection area to the right half sound collection area 43 (S25).

When the positions of the face regions of all the sound collection targets are not in only the left half or only the right half of the captured image un (NO in S22), the controller 135 determines the sound collection area to the front sound collection area 44 (S26). As shown in FIGS. 6D and 6A, the front sound collection area 44 has the angle range 402 wider than the angle range 401 of the front center sound collection area 41. That is, the front sound collection area 44 includes subjects of the sound collection targets positioned in a range wide in the X-axis direction in the captured image Im.

In the example in FIG. 15C, the sound collection targets correspond to the face regions R1, R2, and R3. The center positions x1, x2, and x3 of the face regions R1 to R3 include the positions x1 and x2 outside the center range (x0±xe) (NO in S20) Furthermore, the center positions x1 to x3 include the position x1 within the left half range and the positions x2 and x3 within the right half range (NO in S22 and S23). Therefore, in the present example, the sound collection area is determined to the front sound collection area 44 (S26).

After determining the sound collection area (S21, S24 to S26), the controller 135 records the determined sound collection area in the buffer memory 125 or the like as management information (S27). Thus, the determination processing of the sound collection area (S4) ends, and the process proceeds to step S5 in FIG. 10.

According to the above processing, the sound collection area is determined from a plurality of predefined sound collection areas so as to include all the sound collection targets according to the position of the subject determined as the sound collection target on the captured image. Thus, for capturing a moving image, it is possible to determine the sound collection area so as to include a subject of the sound collection target in line with the user's intention.

FIGS. 17A and 17B are diagrams for illustrating the management information obtained by the determination processing of the sound collection area (S4). FIG. 17A illustrates the management information obtained at the phase of performing the selection processing of the sound collection target (S3) and the determination processing of the sound collection area (S4) in the example in FIGS. 13A and 15A. FIG. 17B illustrates the management information in the example in FIGS. 13B and 15B.

For example, the management information associates and manages the "sound collection target" determined by the selection processing of the sound collection target (S3), the "sound collection area", "horizontal angle of view", and "focusing distance" determined by the determination processing of the sound collection area (S4). The focusing distance is acquired when the AF control by face recognition (S1) is performed, for example. For example, the controller 135 may acquire the corresponding focusing distance based on the positions or focal lengths of various lenses of the optical system 110 at the time of focusing. In addition, the digital camera 100 may detect the focusing distance by the depth from defocus (DFD) technique or the measurement by a range sensor.

In the digital camera 100 of the present embodiment, the angle of view θe of the center range used for the determination of the front center sound collection area (S20) can be set, and is recorded in the ROM of the controller 135, for example. In addition, a user interface for setting the angle of view θe may be provided. For example, the value set by the user using the operation member 150 may be held in the buffer memory 125 or the like.

1-2-4. Sound Collection Control (1) Step S5 in FIG. 10

Details of the sound collection control with face recognition in step S5 in FIG. 10 will be described with reference to FIGS. 16 to 18B.

For the sound collection control by the sound collection parameter setting, the digital camera 100 of the present embodiment sets the sound collection gain so as to emphasize the moving image audio of the subject corresponding to the face region of the AF target, for example. The sound collection gain has a frequency filter characteristic and a stereo separation characteristic, for example. The digital camera 100 calculates the sound collection gain based on the horizontal angle of view and the focusing distance obtained when the digital camera 100 focus on the face region of the AF target during shooting a moving image, for example. The sound collection gain is defined such that the sound zoom effect is achieved by suppressing the frequency band other than the human voice as the calculated value increases and by controlling the stereo effect, for example.

Figure 16:
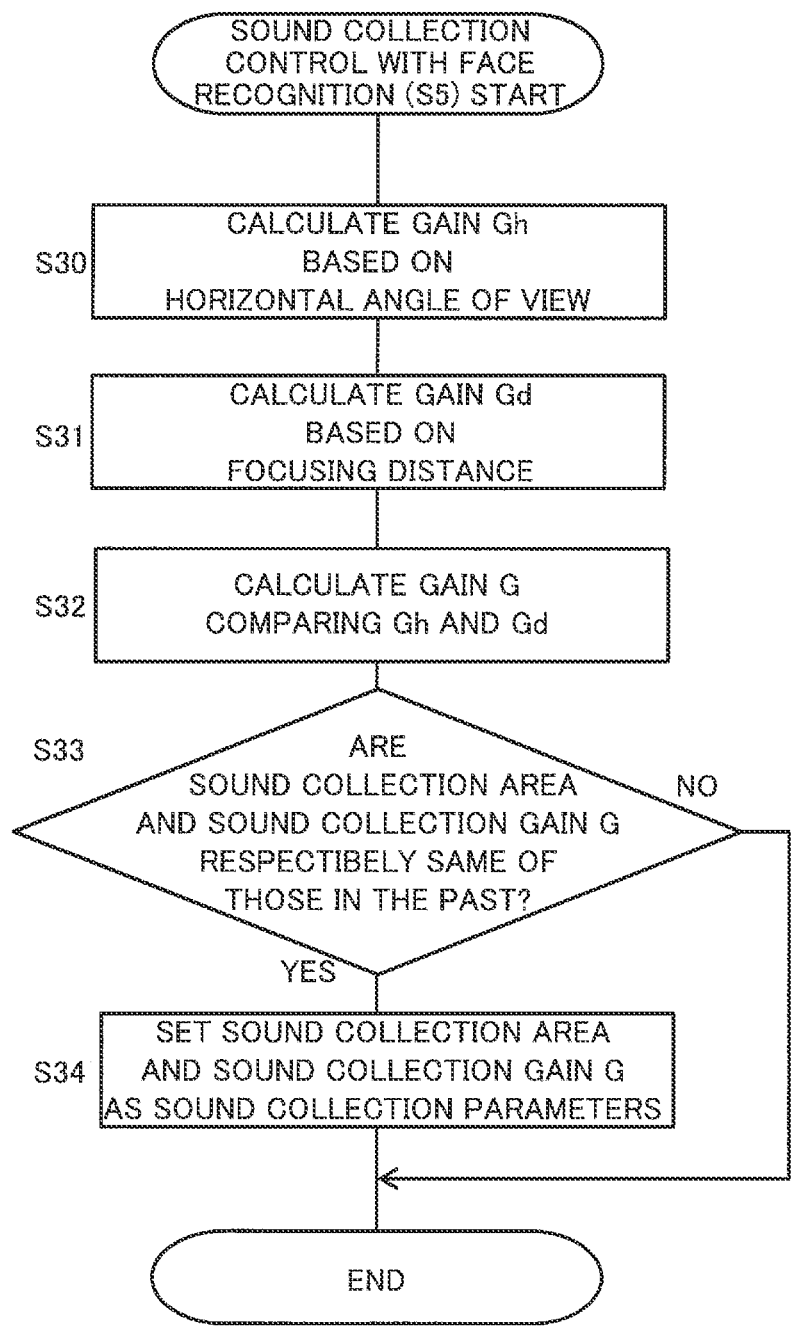
FIG. 16 is a flowchart illustrating sound collection control with face recognition (S5 in FIG. 10) of the digital camera 100.

FIG. 16 is a flowchart illustrating the sound collection control with face recognition (S5). Each process shown in the flowchart in FIG. 16 is performed by, for example, the controller 135 of the digital camera 100, after step S4 in FIG. 10 is performed.

The digital camera 100 starts the processing in step S5 in a state where the management information shown in FIGS. 17A and 17B is held.

Figure 18A:
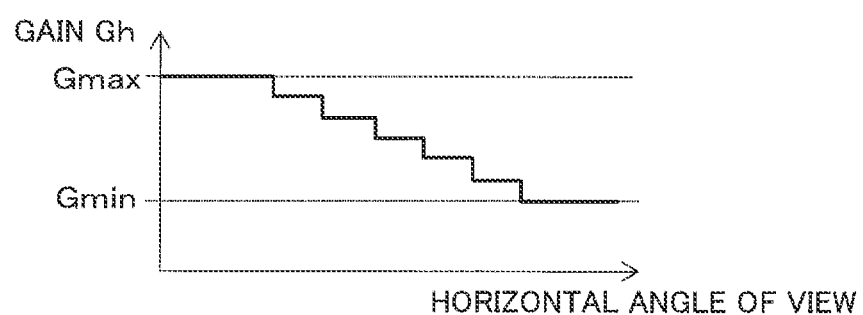
FIGS. 18A and 18B are diagrams illustrating relationships for obtaining gains from a horizontal angle of view and a focusing distance of the digital camera 100.

The controller 135 acquires the horizontal angle of view from the buffer memory 125, for example, and calculates a gain Gh based on the horizontal angle of view (S30). FIG. 18A illustrates the relationship for obtaining the gain Gh from the horizontal angle of view. In the example in FIG. 18A, within a predetermined maximum value Gmax and a predetermined minimum value Gmin of the gain, the gain Gh increases as the horizontal angle of view decreases. Thus, the smaller the horizontal angle of view is due to zooming or the like, the larger the gain becomes at the time of sound collection, so that the sound of the subject shot on the telephoto side can be emphasized.

Figure 18B:
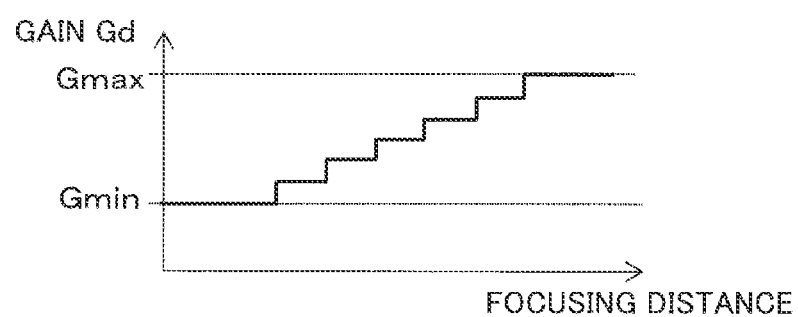

The controller 135 acquires the focusing distance in the same manner as in step S30, and calculates a gain Gd based on the focusing distance (S31). FIG. 18B illustrates a relationship for obtaining the gain Gd from the focusing distance. In the example in FIG. 18B, within the predetermined maximum value Gmax and minimum value Gmin of the gain, the gain Gd increases as the focusing distance increases. Thus, the farther the focusing subject is from the digital camera 100, the larger the gain becomes during the sound collection. Thus, the sound can be more emphasized for the distant subject.

The controller 135 compares the sound collection gain Gh according to the calculated horizontal angle of view with the sound collection gain Gd according to the focusing distance, and sets a larger gain of the two gains Gh and Gd as a sound collection gain G (S32). Thus, the sound collection gain G can be calculated so that the sound of the subject is emphasized in line with the intention of the user who shoots, for example, at a telephoto horizontal angle of view or a long focusing distance.

The controller 135 determines whether or not the calculated sound collection gain G and the determined sound collection area are respectively the same over a predetermined number of times in the past (e.g., five times) (S33). For example, the sound collection gain G is stored together with the above management information each time when the sound collection gain G is calculated, within a predetermined number of times of the execution cycle for steps S1 to S5 in FIG. 10. When the controller 135 determines that the sound collection gain G and the sound collection area of the predetermined number of times in the past are respectively the same (YES in S33), the process proceeds to step S34.

The controller 135 sets the sound collection target determined by the selection processing of the sound collection target in step S3, the sound collection area determined by the determination processing of the sound collection area in step S4, and the sound collection gain G calculated in step S32, as sound collection parameters in the audio processing engine 170 (S34). The audio processing engine 170 causes the beam former 172 and the gain adjuster 174 to achieve a sound collection area and a sound collection gain corresponding to the set sound collection parameters.

After setting the sound collection parameters (S34), the controller 135 ends the processing of sound collection control with face recognition (S5). When determining that the sound collection gain G and the sound collection area of the predetermined number of times in the past are not respectively the same (NO in S33), the controller 135 ends the processing in step S5 in FIG. 10 without performing the processing in step S34. Thereafter, the processing from step S1 onward in FIG. 10 is repeated.

According to the above processing, the calculated sound collection gain, the sound collection target and sound collection area determined based on face recognition are set as sound collection parameters. In this way, it is possible to achieve a sound collection area and a sound collection gain that make it easier to clearly collect the sound of the subject of the sound collection target including the AF target.

The execution order of steps S30 and S31 is not limited to the order of the present flowchart. For example, the gain Gh may be calculated in step S30 after the gain Gd is calculated in step S31, or steps S30 and S31 may be performed in parallel.

In addition, according to the above step S33, the processing of setting the sound collection parameters (S34) is performed only when the sound collection area and the sound collection gain G do not change a predetermined number of times (e.g., 5 times). Thus, it is possible to prevent the sound collection area and the sound collection gain G from being changed excessively frequently due to the movement or the like of the subject. This enables the digital camera 100 to achieve the sound collection control with face recognition (S5) accurately in line with the user's intention.

(2) Step S6 in FIG. 10

Details of the sound collection control without face recognition (S6) in step S6 in FIG. 10 will be described with reference to FIG. 19.

Figure 19:
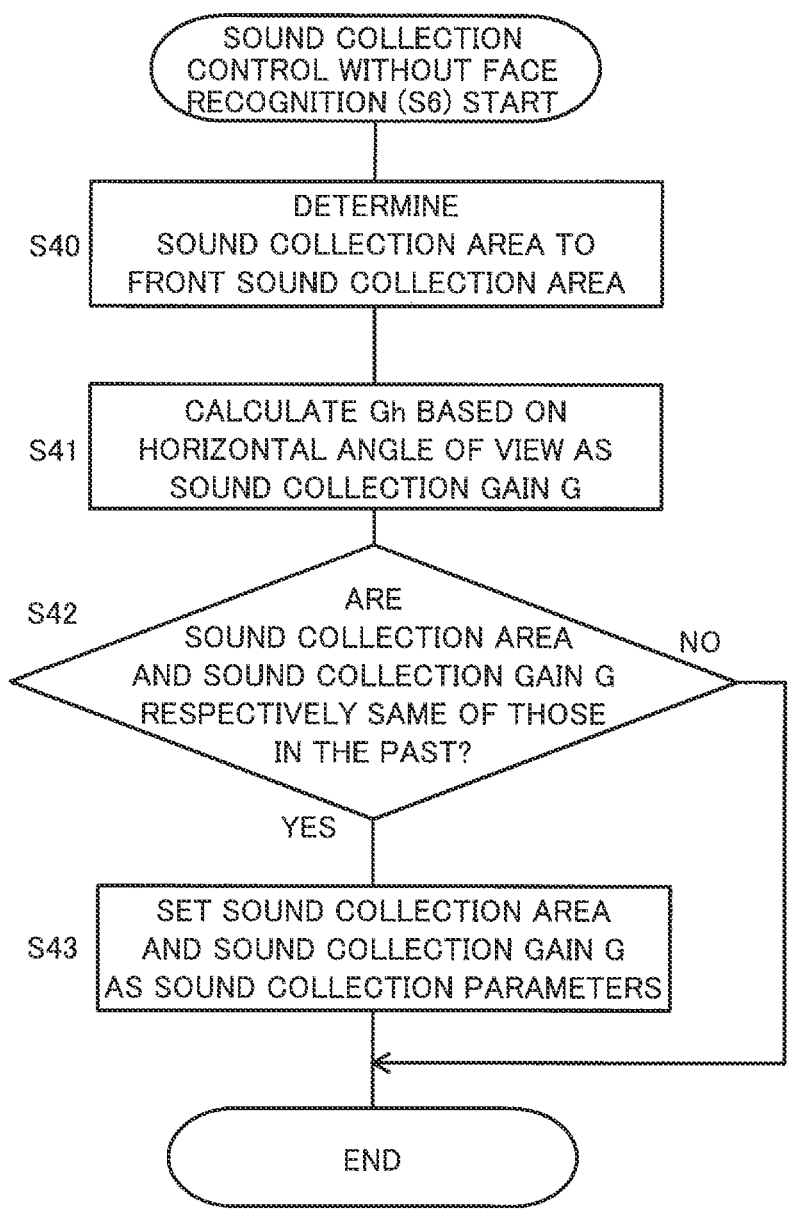
FIG. 19 is a flowchart illustrating a sound collection control without face recognition (S6 in FIG. 10) of the digital camera 100.

FIG. 19 is a flowchart illustrating the sound collection control without face recognition (S6). When there is no face region of the AF target in step S2 in FIG. 10, such as no face region being detected (NO in S2), each process shown in the flowchart in FIG. 19 is performed by the controller 135 of the digital camera 100, for example.

At first, the controller 135 determines the sound collection area to, for example, the front sound collection area 44 (S40).

Next, the controller 135 calculates the gain Gh based on the horizontal angle of view and sets the gain Gh as the sound collection gain G (S41) in the same manner as in step S30. Furthermore, similarly to step S33, the controller 135 determines whether the calculated sound collection gain G and the determined sound collection area are respectively the same over a predetermined number of times in the past (S42).

When determining that the sound collection gain G and the sound collection area of the predetermined number of times in the past are respectively the same (YES in S42), the controller 135 sets the sound collection area and the sound collection gain G as the sound collection parameters (S43) and ends the sound collection control without face recognition (S6). When determining that the sound collection gain G and the sound collection area of the predetermined number of times in the past are not respectively the same (NO in S42), the controller 135 ends the processing in step S6 in FIG. 10 without performing the processing in step S43. After the end of step S6, the processing from step S1 onward is repeated.

According to the above processing, even when there is no face region of the AF target, a wide range of sound in front of the digital camera 100 is collected. In addition, as the horizontal angle of view becomes smaller due to zooming or the like, the sound collection gain is enlarged. Thus, it is possible to make it easier to clearly collect the sound in a range to be captured.

An entire sound collection area may be defined and determined as the sound collection area in step S40 according to the operation mode of the digital camera 100. The entire sound collection area has an angular range of 360° around the digital camera 100. In this case, for example, only the entire sound collection area may be set as the sound collection parameter.

1-2-5. Auto Mode Operation

The details of the operation in the auto mode of the digital camera 100 according to the present embodiment will be described with reference to FIGS. 20 to 21C.

Figure 20:
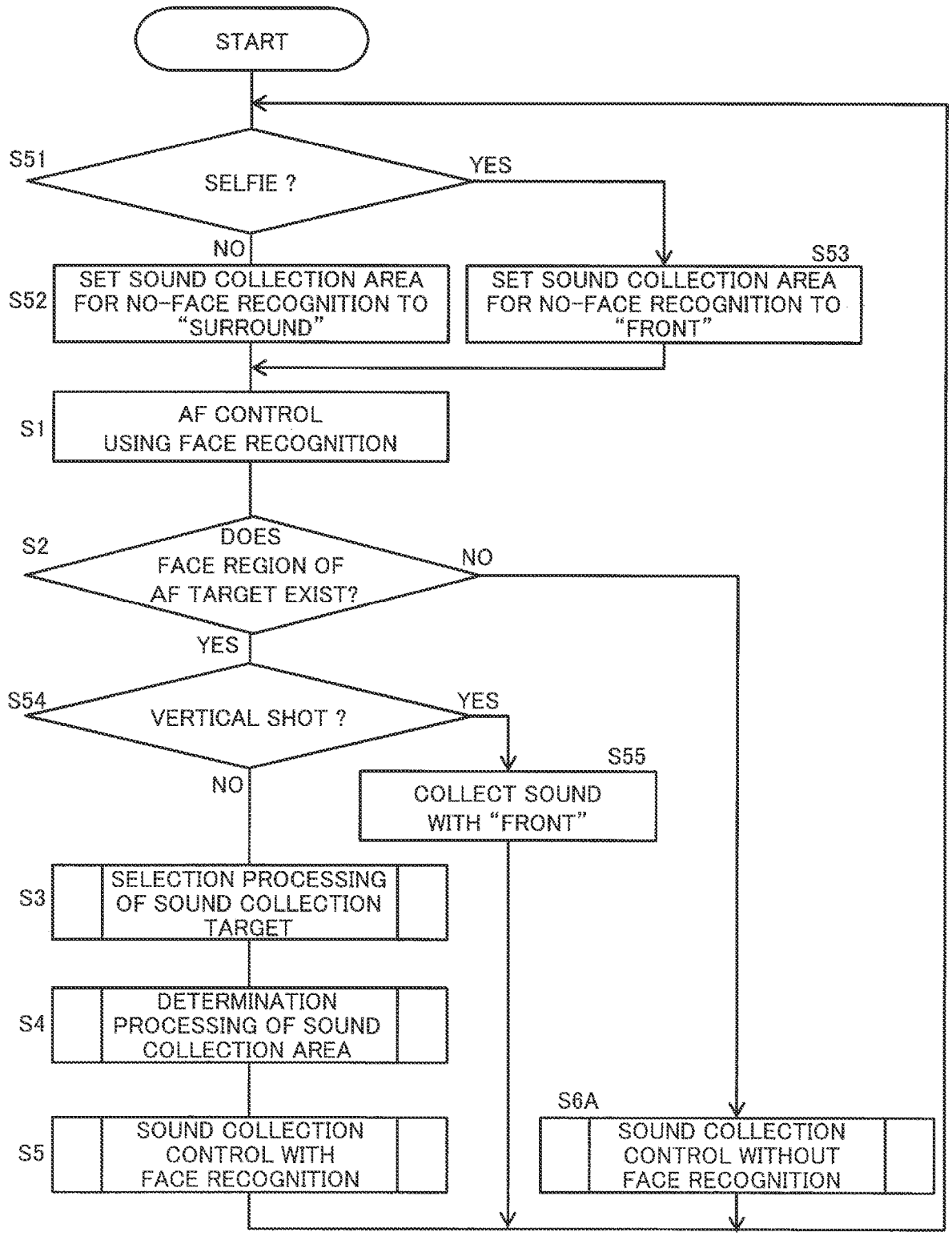
FIG. 20 is a flowchart illustrating the operation in the auto mode of the digital camera 100 according to the first embodiment.

FIG. 20 is a flowchart illustrating the operation in the auto mode of the digital camera 100 according to the first embodiment. Each processing shown in the flowchart in FIG. 20 is executed by the controller 135, as in FIG. 10, in a state where the digital camera 100 is set in the auto mode, for example.

As shown in FIG. 20, in the digital camera 100 in the auto mode, the controller 135 determines whether or not the display monitor 130 is in the selfie position based on the detection signal of the magnetic sensor 132, for example (S51). When determining that the display monitor 130 is not in the selfie position (NO in S51), the controller 135 sets the sound collection area for no-face recognition to the sound collection area 45 in the surround mode (S52). On the other hand, when determining that the display monitor 130 is in the selfie position (YES in S51), the controller 135 sets the sound collection area for no-face recognition to the sound collection area 46 in the front mode (S53).

The controller 135 performs processing of face recognition as in the focus mode described above (S1, S2). For example, when detecting the face region of the AF target (YES in S2), the controller 135 determines whether or not the digital camera 100 is in the vertical shooting attitude based on the detection signal of the acceleration sensor 137 (S54). When determining that vertical shooting is not performed (NO in S54), the controller 135 performs the same processing in steps S3 to S5 as in the focus mode, and executes sound collection control. On the other hand, when determining that vertical shooting is performed (YES in S54), the controller 135 uses the sound collection area 46 in the front mode and performs the sound collection control (S55).

In addition, when not detecting the face region of the AF target (NO in S2), the controller 135 performs sound collection control without face recognition based on the setting results in steps S52 and S53 (S6A). The sound collection control in step S6A is performed in the same manner as in step S6 described above, using the sound collection area set as the sound collection area for no-face recognition.

According to the above processing, it is possible to achieve the operation in the auto mode in which the directivity of the microphone 161 is adjusted in linkage with various shooting states. The sound collection control at the horizontal shooting and vertical shooting in the auto mode will be further described with reference to FIGS. 21A to 21C.

Figure 21A:
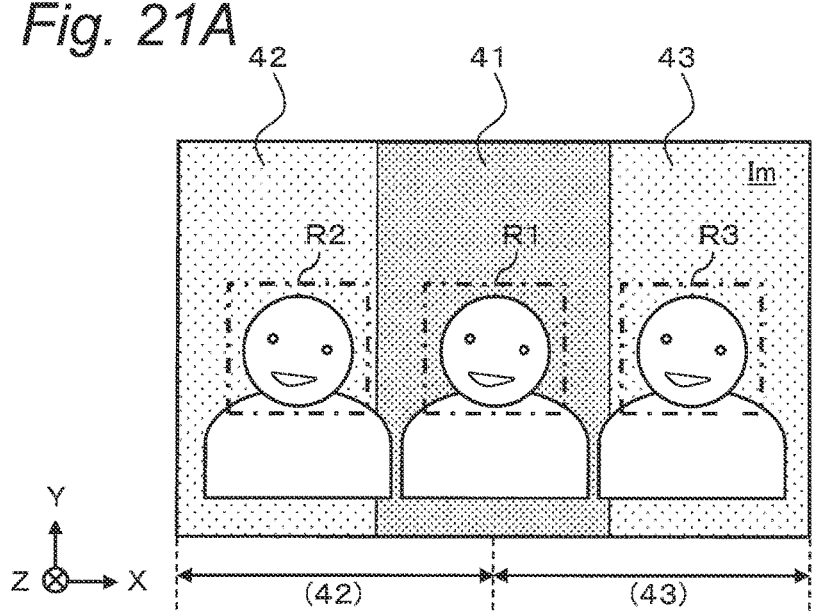
FIGS. 21A to 21C are diagrams for illustrating the sound collection control at the horizontal shooting and the vertical shooting in the auto mode.
Figure 21B:
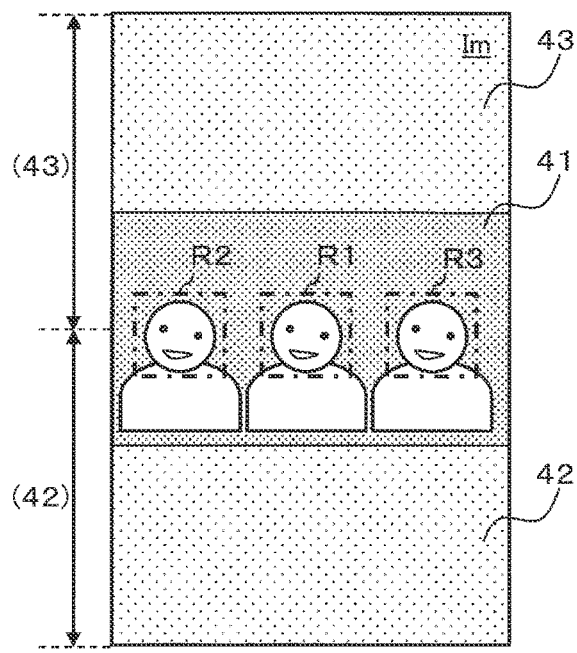

FIG. 21A illustrates the relation between the captured image Im and the sound collection areas 41 to 43 at the horizontal shooting. FIG. 21B illustrates a case where step S55 is not performed at the vertical shooting. FIG. 21C illustrates a case where step S55 is performed at the vertical shooting.

As illustrated in FIG. 21A, at the horizontal shooting, the sound collection area, the face regions R1 to R3, and the sound collection areas 41 to 43 are in a coaxial relation. Thus, it is possible to control the sound collection as intended, such as to cause the sound collection areas 41 to 43 to match the positions of the desired face regions R1 to R3, by switching the sound collection areas 41 to 43. However, at the vertical shooting, as shown FIG. 21B, the relation between the sound collection areas 41 to 43 and the face regions R1 to R3 does not hold. From this viewpoint, it is conceivable that the sound collection control as intended cannot be performed for the positions of the desired face regions R1 to R3, and rather the sound collection control against the intention occurs.

Figure 21C:
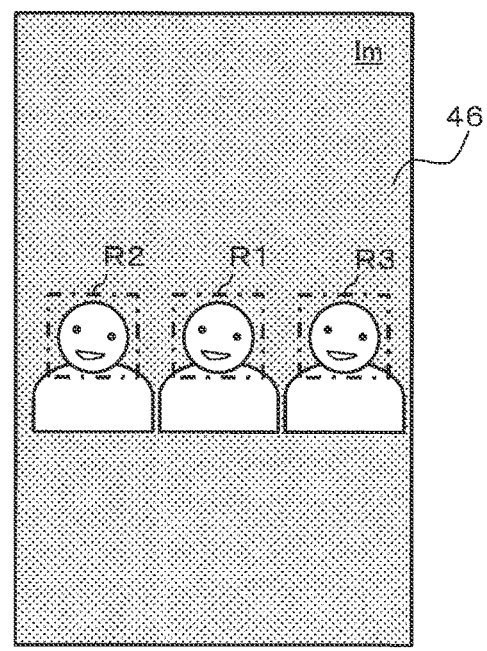

To address this, in the present embodiment, the sound collection area is fixed to the sound collection area 46 in front mode as shown in FIG. 21C at the vertical shooting. Thus, it is possible to keep a range in which sound can be collected over a range during image capturing, and to avoid a situation in which sound collection control against the intention occurs.

1-3. Effects and the Like

In the present embodiment, the digital camera 100 includes the image sensor 115 as an example of the image sensor, the microphone 161 as an example of the audio input device, the operation member 150 as an example of a setting interface, and the controller 135 as an example of a controller. The image sensor 115 captures a subject and generates image data. The microphone 161 inputs audio to generate an audio signal indicating audio to be collected during image capturing with the image sensor. The operation member 150 sets the imaging apparatus to the auto mode being an operation mode that automatically changes the directivity of the audio input device in response to the user's instruction. The controller 135 controls the sound collection area for collecting the audio from a subject in the audio signal. When being set to the auto mode, the controller 135 controls the sound collection area to cover the subject by changing the directivity of the microphone 161 in linkage with the image shooting state of the imaging apparatus. Thus, appropriate sound collection control can be achieved according to various shooting states, and it is possible to easily pick up the audio of the subject according to the user's intention when capturing an image with acquiring the audio.

The digital camera 100 of the present embodiment includes the face recognizer 122 as an example of a face detector that detects a face region of a subject in image data. When being set to the auto mode, the controller 135 determines the subject to be collected in the audio signal based on the face region detected by the face recognizer 122, and controls the sound collection area to cover the subject determined as the sound collection target. Thus, sound collection control can be performed according to an image shooting state such as various kinds of face recognition of the subject, and sound collection can be easily performed according to the user's intention.

In the present embodiment, when being set to the auto mode, the controller 135 controls the sound collection area to change the directivity of the audio input device in linkage with the image shooting state in which the imaging apparatus shoots in vertical or horizontal orientation. Thus, sound collection control can be performed according to the image shooting state such as vertical shooting or horizontal shooting, and it is possible to easily perform sound collection according to the user's intention.

In the present embodiment, when being set to the auto mode, the controller 135 controls the sound collection area to change the directivity of the audio input device in linkage with the image shooting state of whether for the photographer to take a selfie. Thus, it is possible to perform sound collection control according to the image shooting state such as whether or not to take a selfie, and to easily perform sound collection according to the user's intention.

The digital camera 100 of the present embodiment further includes the display monitor 130 as an example of the display and the magnetic sensor 132 as an example of the detector. The display monitor 130 has a display screen for displaying an image of the subject or the like, and the display screen is able to be turn toward the subject. The magnetic sensor 132 detects whether or not the display monitor 130 turns the display screen to the subject side. The setting interface of the present embodiment may be set to the auto mode when the magnetic sensor 132 detects that the display monitor 130 turns the display screen to the subject side. For example, the controller 135 may automatically set the digital camera 100 to the auto mode when the display monitor 130 is in the selfie position in response to the detection signal from the magnetic sensor 132.

In the digital camera 100 of the present embodiment, according to the user's instruction, the setting interface can be set to at least one of a plurality of operation modes in which, in addition to the auto mode, the directivity of the audio input device is different from each other. For example, the setting interface can be set to the surround mode, the front mode, or the navigation mode, and may be further set to the focus mode.

In the digital camera 100 of the present embodiment, when imaging is started by the image sensor 115 in the case where the setting interface is set to the auto mode, the controller 135 may cause the display monitor 130 to display information indicating that the auto mode is set, together with the subject. For example, the controller 135 may cause the display monitor 130 to display an icon or the like dedicated to the auto mode.

Second Embodiment

Hereinafter, the second embodiment will be described with reference to the drawings. In the first embodiment, the digital camera 100 that selects and determines sound collection targets during shooting a moving image or the like is described. In the second embodiment, a digital camera 100 that visualizes information regarding the determined sound collection target to the user during the operation as in the first embodiment will be described.

Hereinafter, description of the same configuration and operation as those of the digital camera 100 according to the first embodiment will be appropriately omitted, and the digital camera 100 according to the present embodiment will be described.

2-1. Outline

An outline of the operation of displaying various kinds of information by the digital camera 100 according to the present embodiment will be described with reference to FIG. 22.

Figure 22:
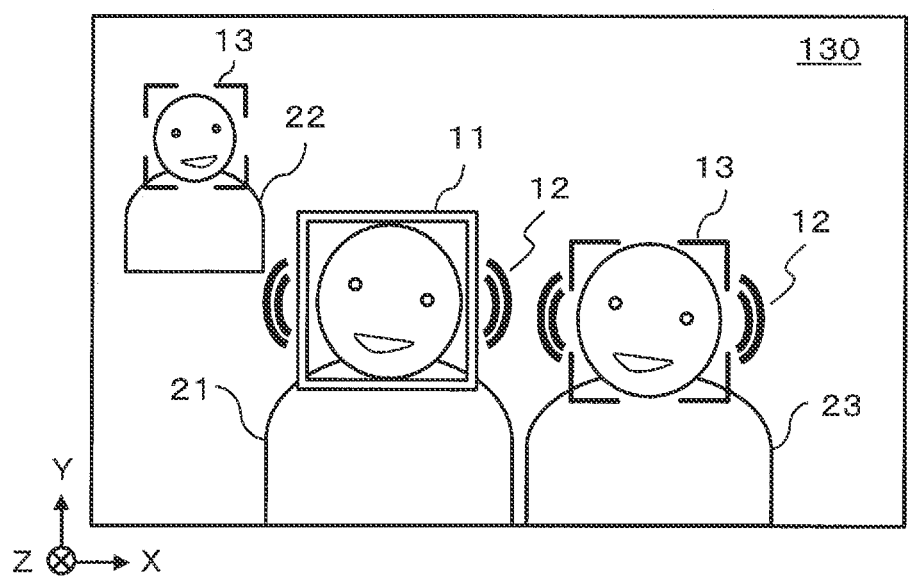
FIG. 22 is a diagram showing a display example of a digital camera 100 according to a second embodiment.

FIG. 22 shows a display example of the digital camera 100 according to the present embodiment. The display example in FIG. 22 shows an example displayed in real time on the display monitor 130 when the digital camera 100 determines the sound collection target as illustrated in FIG. 11B. In the present display example, the digital camera 100 displays a sound collection icon 12 indicating a subject of the sound collection target, in addition to the AF frame 11 showing the subject of the AF target and a detection frame 13 showing a detected subject other than the AF target, on the display monitor 130 in a manner of being superimposed on the captured image Im.

Using the sound collection icon 12 in combination with the AF frame 11 and the detection frame 13, the digital camera 100 of the present embodiment visualizes to the user whether a main subject such as an AF target and a detected subject other than the main subject are determined as the AF target and/or the sound collection target.

For example, in the display example in FIG. 22, since the subject corresponding to the face region R1 (60) in the example in FIG. 11B is determined as the AF target and the sound collection target, the digital camera 100 displays the AF frame 11 and the sound collection icon 12 on the person 21. In addition, since the subject corresponding to the face region R3 in the example in FIG. 11B is determined as the sound collection target other than the AF target, the digital camera 100 displays the detection frame 13 and the sound collection icon 12 on the person 23. Furthermore, by displaying the detection frame 13 without the sound collection icon 12, the digital camera 100 visualizes to the user that the digital camera 100 has determined that in the example in FIG. 11B the subject corresponding to the face region R2 other than the AF target is not the sound collection target.

According to the digital camera 100 of the present embodiment, the user can check whether a detected subject is an AF target by the displayed frame which is either the AF frame 11 or the detection frame 13. The user can also check whether the detected subject is a sound collection target by the presence or absence of the sound collection icon 12. The combination of the AF frame 11 and the sound collection icon 12 is an example of first identification information in the present embodiment. The combination of the detection frame 13 and the sound collection icon 12 is an example of second identification information in the present embodiment. The detection frame 13 is an example of third identification information.

As described above, the digital camera 100 according to the present embodiment performs the display for distinguishing the subject of the determined sound collection target and AF target from the subjects included in the detection information. Thus, the user can grasp the subject of the sound collection target among the subjects detected by the digital camera 100, and can check whether the subject in line with user's intention is determined as the sound collection target, for example.

Figure 23A:
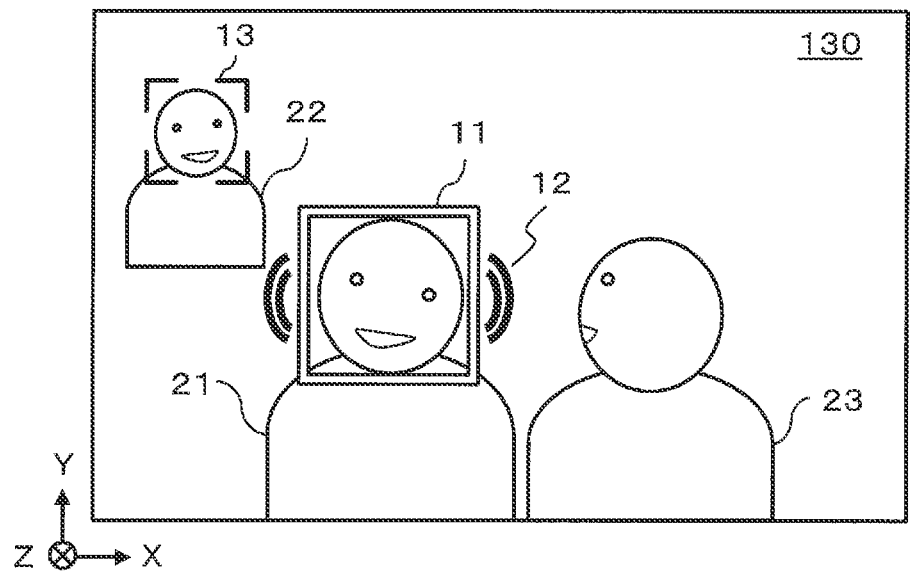
FIGS. 23A and 23B are diagrams for illustrating manual operation in the digital camera 100 of the second embodiment.
Figure 23B:
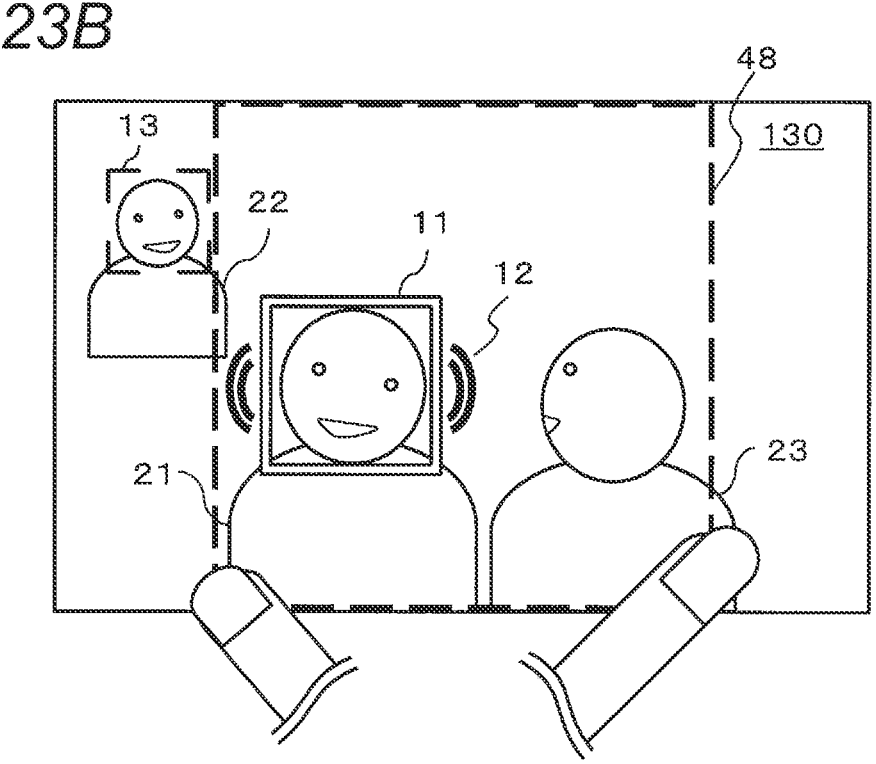
Figure 24:
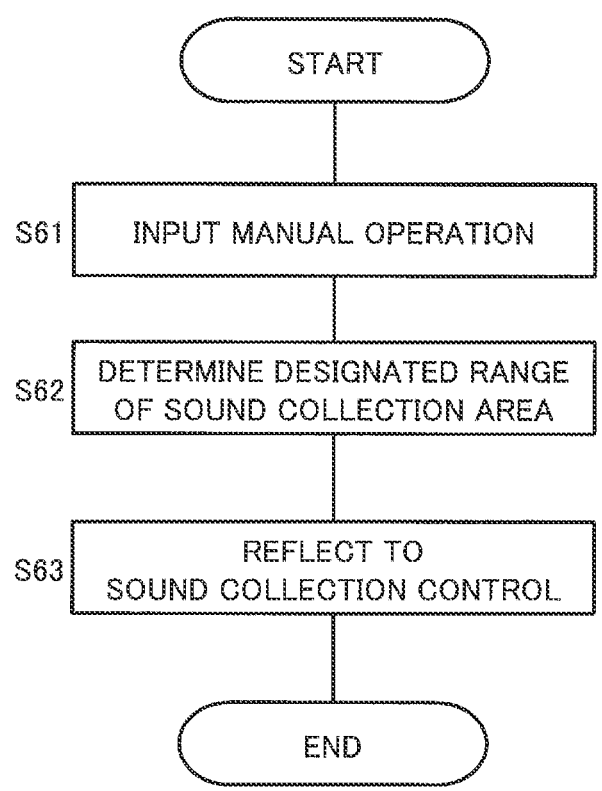
FIG. 24 is a flowchart illustrating the operation at the manual operation in the digital camera 100.

FIGS. 23A and 23B are diagrams for illustrating manual operation in the digital camera 100 of the present embodiment. FIG. 23A illustrates a state in which the specific person 22 is, not detected by the face recognizer 122. For example, even when the photographer desires to collect sound of the person 22, it is anticipated that the face of the person 22 is not recognized because of the face direction of the person 22 sideways or backward with respect to the digital camera 100. In addition, it is also anticipated that the sound source that the photographer desires to collect sound is not a person. In anticipation of such cases, the digital camera 100 of the present embodiment is operable to input a manual operation that enables the sound collection area to be manually set.

FIG. 23B illustrates the manual operation of the sound collection area in the digital camera 100. For example, the manual operation of the sound collection area is implemented as a touch operation 24 is a flowchart illustrating the operation at the manual operation in the digital camera 100. The processing shown in the present flowchart may be executed independently of the above-described auto mode or focus mode processing, or may be executed to interrupt at the time of the auto mode or focus mode processing, for example.

At first, the controller 135 of the digital camera 100 receives manual operation by a user such as a photographer (S61). As shown in FIG. 23B, for example, the controller 135 displays a designated range 48 of the sound collection area on the display monitor 130 at the manual operation. This example is a case where the manual operation is performed to interrupt at the time of the auto mode or focus mode processing.

In the example in 23B, the photographer inputs a manual operation for adjusting the designated range 48 of the sound collection area to include the person 22 whose face is not recognized by a touch operation. The controller 135 determines the designated range 48 of the sound collection area based on the input manual operation (S62). When the start point and end point serving as the sound collection range are input by touch operation as the manual operation, the sound collection range 48 of predetermined size including the start point and end point is displayed. When the confirmation button displayed on the display monitor 130 is touch-operated in this state, the sound collection range 48 is confirmed.

The controller 135 causes the determined designated range 48 of the sound collection area to be reflected in the sound collection control of the microphone 161 (S63). Thus, the sound collection control is executed so as to emphasize the audio from the sound collection area corresponding to the designated range 48.

[2-3. Effects and the Like]

As described above, the digital camera 100 of the present embodiment includes the image sensor 115 that captures a subject and generates image data, the microphone 161 that inputs an audio signal indicating audio to be collected during image capturing with the image sensor 115, and the display monitor 130 that displays an image of the subject. The digital camera 100 of the present embodiment includes an input interface such as the operation member 150 for inputting a user operation for setting a subject displayed on the display monitor 130 in a sound collection area for collecting sound from the subject, and the controller 135 that controls a sound collection area in an audio signal. When a user operation for setting the sound collection area is input, the controller 135 controls the sound collection area to cover the subject by changing the directivity of the microphone 161 based on the user operation. With this manual operation, it is possible to control the sound collection area, and to facilitate sound collection according to the user's intention.

In the digital camera 100 of the present embodiment, the display monitor 130 may be configured to allow the display screen to turn to the subject side, as in the first embodiment. The user operation may be performed in a state where the display monitor 130 turns the display screen to the subject side. That is, the above-described manual operation may be input when taking a selfie in the digital camera 100.

Other Embodiments

As described above, each embodiment described above is described as an example of the technique disclosed in the present application. However, the technique in the present disclosure is not limited to this, and can also be applied to embodiments in which changes, substitutions, additions, omissions, and the like are made as appropriate. In addition, it is also possible to combine each component described in each embodiment described above to form a new embodiment.

In the first embodiment, an example in which the three microphone devices 161L, 161C, and 161R are used for the microphone 161 has been described. A modification using four microphone devices will be described with reference to FIGS. 25 to 26.

Figure 25:
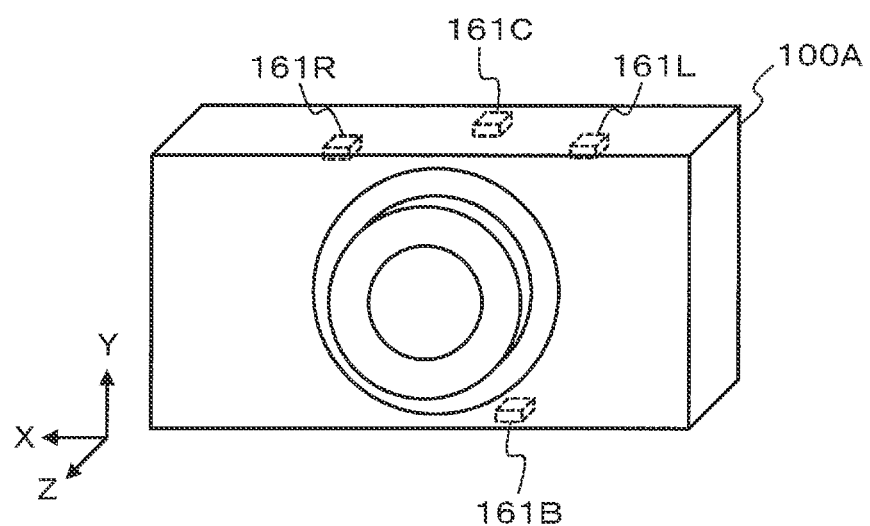
FIG. 25 is a diagram illustrating the arrangement of a microphone 161A in a digital camera 100A of a modification.

FIG. 25 illustrates the arrangement of a microphone 161A in a digital camera 100A of the present modification. In the present modification, the microphone 161A of the digital camera 100A includes a fourth microphone device 161B in addition to the three microphone devices 161L, 161C, and 161R mutually arranged on the XZ plane. The fourth microphone device 161B is arranged so that the position in the Y direction is different from that of the other microphone devices 161L to 161R.

Figure 26:
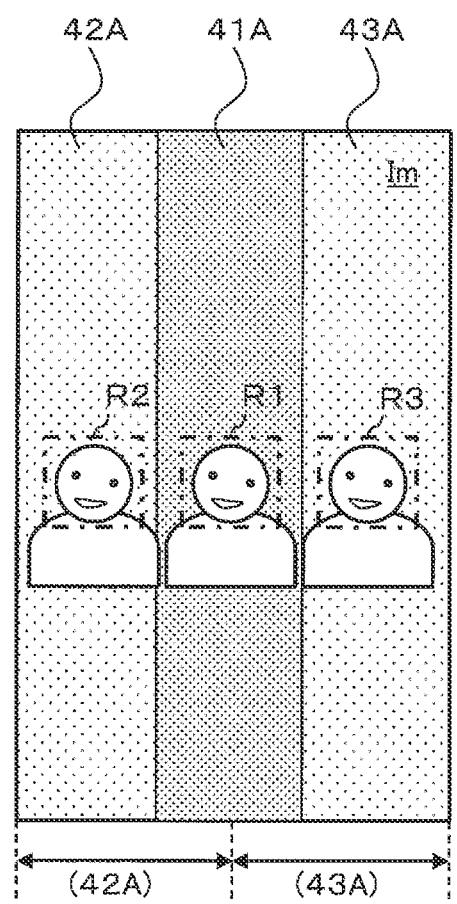
FIG. 26 is a diagram for illustrating the sound collection control at the vertical shooting in the auto mode in the modification.

FIG. 26 illustrates the relation between the captured image Im and sound collection areas 41A to 43A at the vertical shooting in the present modification. According to the configuration of the microphone 161A described above, the sound collection area can be changed even in the Y-axis direction of the digital camera 100. Therefore, for sound collection control at the vertical shooting, utilizing the sound collection area using the fourth microphone device 161B makes it possible to achieve sound collection control that follows face recognition even at the vertical shooting, as exemplified in FIG. 26. For example, the controller 135 of the digital camera 100A of the present modification performs sound collection control using the fourth microphone device 161B as described above instead of step S55 in the same processing as in FIG. 20. Thus, even at the vertical shooting, it is possible to control the sound collection as intended, such as to cause the sound collection areas 41A to 43A to match the positions of the desired face regions R1 to R3, using the sound collection areas 41A to 43A.

In the sound collection control described in each of the above embodiments, using slow and fast for the period of causing the sound collection area to transition in linkage with face recognition makes it possible to further suppress the sense of discomfort in auditory sensitivity. An example of this operation will be described with reference to FIG. 27.

FIG. 27 shows an operation example in which the width of the sound collection directivity (i.e., the angle range of the sound collection area) is changed in linkage with the presence or absence of face recognition in the digital camera 100. In the present operation example, the face of the subject is detected by the face recognizer 122 of the digital camera 100 at time t1. Then, false-detection filtering control (i.e., chattering) is performed (see S33 in FIG. 16).

For example, it is conceivable that charging the sound collection directivity at the time when a face is recognized only for a moment or when the face-recognized subject turns sideways might cause the user listening to the sound collection result to feel a sense of discomfort in auditory sensitivity. To address this, the above-described false-detection filtering control constantly monitors the position of the face-recognized subject, and changes the sound collection directivity when the person is in the sound collection area for a certain period. Thus, it is possible to avoid the above-described sense of discomfort in auditory sensitivity.

In addition, the controller 135 of the digital camera 100 causes the sound collection area to transition so as to narrow the sound collection directivity after chattering from the time t1. The transition period for narrowing the sound collection directivity is set relatively short, for example. Thus, when the face of the subject is detected in image recognition, it is possible to give a quick change so that the sound collection directivity is focused on the detected face, and give a better impression in auditory sensitivity to the user who listens to the sound collection result. In addition, the transition between the sound collection areas in the same angle range, such as the front center sound collection area 41 and the left half sound collection area 42, is also performed relatively quickly in the same manner as described above, for example.

In the example in FIG. 27, the face of the subject is not detected by the face recognizer 122 at time t2, for example, since the subject moves, or the subject turns the face sideways. Also in this case, after the chattering control, the digital camera 100 causes the sound collection directivity to transition. Here, the transition period at the time of expanding the range of sound collection directivity is set longer than the transition period at the time of narrowing the range described above. Thus, it is possible to avoid giving the user a sense of discomfort in auditory sensitivity due to the sudden occurrence of hearing sound from a wide range. Rather, slowing down the transition at the time of expanding the range of sound collection directivity makes it possible to suppress the user's sense of discomfort in auditory sensitivity.

Furthermore, in the present example, at time t3, the face is recognized again during the transition period in which the sound collection directivity is expanded. In this case, the digital camera 100 switches to the control of narrowing the sound collection directivity again before completely expanding the sound collection directivity as the interrupt control. Thus, when the face recognition of the subject is intermittent, the control of directing the sound collection directivity to the subject whose face is recognized is promptly performed. Thereby, the user's sense of discomfort in auditory sensitivity can be further suppressed.

In each of the above embodiments, the face recognizer 122 has been used to detect the sound collection target. In the present embodiment, the detection of the sound collection target is not limited to the face recognizer 122, and for example, instead of or in addition to this, human body recognition that recognizes the whole or at least a part of the human body may be used. In addition, the sound collection target does not necessarily have to be a person, and may be, for example, various animals. In this case, the sound collection target may be detected by image recognition of a part or the whole of the animal.

In the second embodiment, the first identification information, the second identification information, and the third identification information identify whether or not a subject is the main subject in the presence or absence of the AF frame 11, and identify whether or not a subject is the sound collection target in the presence or absence of the sound collection icon 12. In the present embodiment, the first to third identification information are not particularly limited to these, and may be, three types of frame display, for example. FIG. 22 illustrates three types of frame display in the present embodiment. The example in FIG. 22 illustrates a frame display 11A showing the subject of the AF target and of the sound collection target, a frame display 13A showing the subject of other than the AF target and of the sound collection target, and a frame display 13B showing the subject other than the sound collection target. Thus, the display of a subject of the AF target and the display of the sound collection target are integrally performed, and the display of a subject of other than the AF target and the display of the sound collection target are also integrally performed.

In the above-described first and second embodiments, the operation in the auto mode and the manual operation have been described, respectively, but these may be combined. That is, the digital camera 100 of the present embodiment may include a display monitor 135 as the display that displays the image of the subject, and the operation member 150 as the input interface for inputting a user operation for setting the subject displayed on the display monitor 135 to the sound collection area that picks up the audio from the subject. When a user operation for setting the sound collection area is input, the controller 135 may control the sound collection area so as to include the subject by changing the directivity of the microphone 161 based on the user operation. In this case, the display monitor 135 does not have to be particularly movable, and may be a fixed type fixed in the above-described normal position or the like, for example.

In the first and second embodiments, in the flowchart in FIG. 10, the operation example of performing the sound collection control with or without face recognition (S5 or S6) using the microphone 161 built in the digital camera 100 is described. The digital camera 100 of the present embodiment may include an external microphone (hereinafter referred to as "microphone 161a") instead of the built-in microphone 161. The microphone 161a includes microphone devices outside the digital camera 100, and includes three or more microphone devices. In the present embodiment, on the microphone 161a, the controller 135 holds information regarding the arrangement of microphone devices in the buffer memory 125 or the like in advance, whereby the controller 135 can perform step S5 or S6 similarly to that of the first embodiment. Also in this case, it is possible to easily obtain the sound of the subject clearly according to the sound collection target and/or the sound collection area determined as in the first embodiment.

In addition, in the first and second embodiments, in the flowchart in FIG. 16, the operation example in which the gain Gh is calculated based on the horizontal angle of view that corresponds to the image capturing range of the digital camera 100 (S30) is described. The horizontal angle of view in this case is the same as the horizontal angle of view θh used for the determination of the front center sound collection area (S20) in the flowchart in FIG. 14. In the present embodiment, a horizontal angle of view different from the horizontal angle of view θh in step S20 may be used for calculating the gain Gh. For example, an angle range corresponding to the width in the X-axis direction including all subjects of the sound collection targets on the captured image is set as the horizontal angle of view in step S30. Thus, the gain Gh can be calculated according to the angle of view in which the sound collection target appears, so that a voice of a distant subject can be more clearly collected.

In addition, in the first and second embodiments, the face recognizer 122 detects a human face. In the present embodiment, the face recognizer 122 may detect a face of an animal, for example. Animal faces are various in size depending on the type of the animal. Even in this case, for example, enlarging the predetermined range for selecting the sound collection target (see S14) allows the sound collection target to be selected as in the first embodiment. Furthermore, the face recognizer 122 may detect a face for each type of animals and set the predetermined range in step S14 according to the type.

In addition, in the first and second embodiments, the digital camera 100 including the face recognizer 122 is described. In the present embodiment, the face recognizer 122 may be provided in an external server. In this case, via the communication module 160, the digital camera 100 may transmit the image data on the captured image to the external server and receive the detection information on the processing result by the face recognizer 122 from the external server. In this digital camera 100, the communication module 160 functions as a detector.

In addition, in the first and second embodiments, the digital camera 100 including the optical system 110 and the lens driver 112 is illustrated. The imaging apparatus of the present embodiment may not include the optical system 110 and the lens driver 112, and may be, for example, an interchangeable lens type camera.

In addition, in the first and second embodiments, the digital camera is described as an example of the imaging apparatus, but the present disclosure is not limited to this. The imaging apparatus of the present disclosure may be an electronic apparatus having an image capturing function (e.g., a video camera, a smartphone, a tablet terminal, or the like).

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiments are for illustrating the technique present disclosure, various changes, substitutions, additions, omissions, and the like can be made within the scope of the claims or the equivalent thereof.

The present disclosure can be applied to an imaging apparatus that captures an image while acquiring sound.

The invention claimed is:

1. An imaging apparatus comprising:
   an image sensor configured to capture a subject to generate image data;
   an audio input device configured to input audio to generate an audio signal indicating audio to be collected during image capturing with the image sensor;
   a setting interface configured to set the imaging apparatus to an auto mode being an operation mode operable to automatically change a directivity of the audio input device in response to an instruction of a user; and
   a controller configured to control a sound collection area for collecting sound from the subject,
   wherein the auto mode includes a plurality of sub-modes to transition therebetween for changing the directivity of the audio input device according to an image shooting state of the imaging apparatus, and
   the plurality of sub-modes includes a first sub-mode for changing the directivity of the audio input device according to a first image shooting state in the image shooting state, and a second sub-mode for changing the directivity of the audio input device according to a second image shooting state different from the first image shooting state,
   wherein with the auto mode being set by the setting interface, the controller is configured to:
   control the sound collection area by transitioning to the first sub-mode in linkage with the first image shooting state; and
   control the sound collection area by transitioning to the second sub-mode in linkage with the second image shooting state.

2. The imaging apparatus according to claim 1, further comprising a face detector configured to detect a face region of the subject in the image data as the first image shooting state,
   wherein with the auto mode transitioning to the first image shooting mode, the controller is configured to:
   determine a subject to be a sound collection target for the audio signal, based on the face region detected by the face detector; and
   control the sound collection area to cover the subject determined as the sound collection target therein.

3. The imaging apparatus according to claim 1, wherein with the auto mode being set by the setting interface, the controller is configured to control the sound collection area to change the directivity of the audio input device in linkage with the image shooting state of whether for a photographer to take a selfie.

4. The imaging apparatus according to claim 1, further comprising:
   a display including a display screen for displaying an image of the subject, the display configured to allow the display screen to turn toward the subject; and
   a detector configured to detect whether or not the display turns the display screen toward the subject,
   wherein according to detecting by the detector that the display turns the display screen toward the subject side, the setting interface is configured to set the imaging apparatus to the auto mode.

5. The imaging apparatus according to claim 1, wherein the setting interface is configured to set the imaging apparatus to at least one of a plurality of operation modes, in addition to the auto mode, according to an instruction of the user, the plurality of operation modes each having different directivity of the audio input device from each other.

6. The imaging apparatus according to claim 1, further comprising:
   a display configured to display an image of the subject; and
   an input interface configured to input a user operation for setting the subject displayed on the display into the sound collection area for collecting sound from the subject,
   wherein in response to input of the user operation for setting the sound collection area, the controller is configured to control the sound collection area to cover the subject by changing the directivity of the audio input device based on the user operation.

7. The imaging apparatus according to claim 1, further comprising:
   a face detector configured to detect a face region of the subject in the image data as the first image shooting state;

a display including a display screen for displaying an image of the subject, the display configured to allow the display screen to turn toward the subject; and a detector configured to detect whether or not the display screen is turned toward the subject as the second image shooting state, wherein with the auto mode being set by the setting interface, the controller is configured to:

control the sound collection area to cover the subject therein by the first sub-mode, when the face detector detects the face region and the detector detects that the display screen is turned toward the subject, and control the sound collection area to a predetermined area by the second sub-mode, when the face detector does not detect the face region and the detector detects that the display screen is turned toward the subject.

8. The imaging apparatus according to claim 7, wherein with the auto mode being set by the setting interface, the controller is configured to:

control the sound collection area to a wider area than the predetermined area, when the face detector does not detect the face region and the detector detects that the display screen is not turned toward the subject as the second image shooting state.

9. The imaging apparatus according to claim 7, wherein with the auto mode being set by the setting interface, the controller is configured to:

control the sound collection area to cover the subject therein by the first sub-mode, when the face detector detects the face region and the detector detects that the display screen is not turned toward the subject.

10. An imaging apparatus comprising:

an image sensor configured to capture a subject to generate image data;

an audio input device configured to input audio to generate an audio signal indicating audio to be collected during image capturing with the image sensor;

a setting interface configured to set the imaging apparatus to an auto mode being an operation mode operable to automatically change a directivity of the audio input device in response to an instruction of a user; and a controller configured to control a sound collection area for collecting sound from the subject, wherein with the auto mode being set by the setting interface, the controller is configured to control the sound collection area to change the directivity of the audio input device in linkage with the image shooting state of whether orientation of the imaging apparatus to shoot image is vertical orientation or horizontal orientation.

11. An imaging apparatus comprising:

an image sensor configured to capture a subject to generate image data;

an audio input device configured to input audio to generate an audio signal indicating audio to be collected during image capturing with the image sensor;

a face detector configured to detect a face region of the subject in the image data;

a display configured to display an image of the subject;

an input interface configured to input a user operation for setting a subject displayed on the display into a sound collection area for collecting sound from the subject; and a controller configured to control the sound collection area, wherein the controller is configured to:

determine a subject to be a sound collection target for the audio signal, based on the face region detected by the face detector; and control the sound collection area to cover the subject determined as the sound collection target therein, wherein when an undetected subject is present, in response to input of a user operation for setting the sound collection area to cover the undetected subject therein, the controller is configured to control the sound collection area to cover the undetected subject by changing a directivity of the audio input device based on the user operation, the undetected subject being a subject not detected by the face detector.

12. The imaging apparatus according to claim 11, wherein the display is configured to allow a display screen to turn toward the subject, wherein the user operation is performed in a state where the display turns the display screen toward the subject.

* * * * *